United States Patent
Frenne et al.

(10) Patent No.: US 12,160,384 B2
(45) Date of Patent: Dec. 3, 2024

(54) DEMODULATION REFERENCE SIGNALS FOR SHARED RADIO

(71) Applicant: Telefonaktiebolaget LM Ericsson (publ), Stockholm (SE)

(72) Inventors: Mattias Frenne, Uppsala (SE); Robert Baldemair, Solna (SE); Lars Lindbom, Karlstad (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 280 days.

(21) Appl. No.: 17/776,705

(22) PCT Filed: Nov. 13, 2020

(86) PCT No.: PCT/EP2020/082069
§ 371 (c)(1),
(2) Date: May 13, 2022

(87) PCT Pub. No.: WO2021/094543
PCT Pub. Date: May 20, 2021

(65) Prior Publication Data
US 2022/0416961 A1    Dec. 29, 2022

Related U.S. Application Data

(60) Provisional application No. 62/934,574, filed on Nov. 13, 2019.

(51) Int. Cl.
*H04L 5/00*     (2006.01)
*H04B 7/0452*   (2017.01)

(52) U.S. Cl.
CPC .......... *H04L 5/005* (2013.01); *H04B 7/0452* (2013.01); *H04L 5/0016* (2013.01); *H04L 5/0023* (2013.01)

(58) Field of Classification Search
CPC ...................................................... H04L 5/005
(Continued)

(56) References Cited

U.S. PATENT DOCUMENTS

2016/0182203 A1   6/2016   Fang et al.
2018/0278395 A1   9/2018   Yoon
(Continued)

FOREIGN PATENT DOCUMENTS

CN   107431682 A   12/2017
CN   107439047 A   12/2017
(Continued)

OTHER PUBLICATIONS

3GPP TS 36.211 v16.1.0; Technical Specification; 3rd Generation Partnership Project; Technical Specification Group Radio Access Network; Evolved Universal Terrestrial Radio Access (E-UTRA); Physical channels and modulation (Release 16)—Mar. 2020.
(Continued)

*Primary Examiner* — Sibte H Bukhari
(74) *Attorney, Agent, or Firm* — Baker Botts L.L.P.

(57) ABSTRACT

Methods and apparatus are provided for demodulation reference signal configuration in a shared radio spectrum system. A method performed by a wireless device (110, 200) is provided. The wireless device (200) operating in a communications system, wherein the communications system comprises radio spectrum shared by a plurality of radio access technologies. The method comprising obtaining (600) a configuration for a demodulation reference signal, DMRS, wherein the DMRS comprises a pattern using common resource elements of at least two of the plurality of radio access technologies and transmitting or receiving (630) a data transmission based on the obtained demodulation reference signal. A method performed by a network node (160) is provided. The method comprises the network node
(Continued)

node determining (700) a configuration for a demodulation reference signal, DMRS, wherein the DMRS comprises a pattern using common resource elements of at least two of the plurality of radio access technologies and receiving or transmitting (720) a data transmission based on the determined configuration for the demodulation reference signal.

20 Claims, 18 Drawing Sheets

(58) Field of Classification Search
USPC .......................................................... 370/329
See application file for complete search history.

(56) References Cited

U.S. PATENT DOCUMENTS

| 2019/0230578 | A1* | 7/2019 | Karaki | H04W 72/569 |
| 2022/0116904 | A1* | 4/2022 | Fakoorian | H04W 28/0975 |

FOREIGN PATENT DOCUMENTS

| CN | 108141854 | A | 6/2018 |
| CN | 110383931 | A | 10/2019 |
| EP | 3471499 | A1 | 4/2019 |
| JP | 2016-536932 | A2 | 11/2016 |
| JP | 2018-510547 | A2 | 4/2018 |
| JP | 2018-537889 | A2 | 12/2018 |
| WO | 2019 027300 | A1 | 2/2019 |
| WO | 2019 142524 | A1 | 7/2019 |

OTHER PUBLICATIONS

PCT Notification of Transmittal of the International Search Report and the Written Opinion of the International Searching Authority, or the Declaration issued for International application No. PCT/EP2020/082069—Feb. 19, 2021.
3GPP TSG RAN WG1 Meeting #94bis; Chengdu, China; Source: Qualcomm; Title: Summary of DMRS Issues (R1-1811838)—Oct. 8-12, 2018.
3GPP TSG-RAN WG1 Meeting #97; Reno, Nevada; Source: Qualcomm Incorporated; Title: Multi-TRP Enhancements (R1-1907289)—May 13-17, 2019.
3GPP TSG RAN WG1 Meeting RAN1#98; Prague, Czech Republic; Source: Ericsson; Title: On multi-TRP and multi-panel (R1-1909465)—Aug. 26-30, 2019.
3GPP TSG RAN WG1 Meeting #94bis, Chengdu, China, Oct. 8-12, 2018; Source: Qualcomm; Title: Summary of DMRS Issues; Agenda Item: 7.1.2.4 (R1-1812056).
Notice of Reasons for Refusal issued for Chinese Application No. 2022-528144—Jul. 10, 2023.
Office Action issued for Chinese Application No. 202080092927.6—Nov. 1, 2023.
Search Report issued for Chinese Application No. 2020800929276—Oct. 30, 2023.
EPO Communication Pursuant To Article 94(3) EPC issued for Application No. 20 807 352.8-1206—Sep. 15, 2023.

* cited by examiner

DEMODULATION REFERENCE SIGNALS FOR SHARED RADIO

PRIORITY

This nonprovisional application is a U.S. National Stage Filing under 35 U.S.C. § 371 1f International Patent Application Serial No. PCT/EP2020/082069 filed Nov. 13, 2020 and entitled "DEMODULATION REFERENCE SIGNALS FOR SHARED RADIO" which claims priority to U.S. Provisional Patent Application No. 62/934,574 filed Nov. 13, 2019 both of which are hereby incorporated by reference in their entirety.

TECHNICAL FIELD

The present disclosure relates to demodulation reference signals (DMRS) in a system with radio spectrum shared by different radio access technologies, and in particular, the configuration thereof.

BACKGROUND

In mobile radio systems like LTE and NR, a reference signal (RS) is typically transmitted to aid radio channel knowledge but can also be transmitted for tracking impairments induced by a local oscillator of a transceiver. The design of a reference signal will depend on its use case and several types of reference signals are needed in a mobile radio system. The main purpose of a reference signal will often be reflected by its name.

For example, a reference signal designed and used for coherent demodulation of a physical layer channel is referred to as DM-RS, a reference signal designed and used for acquiring channel state information in downlink is referred to as CSI-RS and a reference signal designed for tracking of time and frequency differences between transmitter and receiver is referred to as TRS.

In LTE on the other hand, a cell-specific reference signal (CRS) was specified which have multiple purposes including mobility and new cell detection. The CRS can therefore never be disabled, it must always be transmitted by a LTE cell, even if there are no users served. LTE also has the possibility to use DM-RS based demodulation of the data, when configured in any of the Transmission modes 7-10. Here, transmission mode (TM) 9 and TM 10 are most interesting since these DM-RS patterns support up to eight ports, to allow for high spectral efficiency transmission and high degree of multi-user MIMO, i.e. many co-scheduled users on the same time and frequency resource using orthogonal DM-RS.

Due to the wide range of use cases envisioned for NR, and also other factors, according to 3GPP agreements, each of the reference signals mentioned above is very configurable. They may occupy many different OFDM symbols within a slot of a radio frame and may also occupy different sets of subcarriers in each OFDM symbol.

The NR DMRS can be configured with 1, 2, 3 or 4 DMRS symbols in a slot (where a slot has 14 OFDM symbols). The physical downlink shared channel (PDSCH) can be scheduled with less than 14 symbols in which case the DMRS are moved closer to each other and eventually being dropped in such cases that the PDSCH duration is too short to accommodate the configured number of DMRS symbols. An overview of NR DMRS positions in Rel.15 can be seen in the FIG. 1, showing possible NR DMRS symbol locations within a slot of 14 symbols. Both single and double symbol DMRS is supported where double means that DMRS symbols comes pairwise, using adjacent symbols.

As can be seen in FIG. 1, as an example, if PDSCH duration is 11 symbols and two additional DMRS symbols are configured, then they will be placed in symbol index 6 and 9, where symbol index numbers runs from 0 to 13. The position of the first symbol containing DMRS is either in the symbol with index 2 or 3 and is given by cell specific system information provided by the master information block (MIB).

If a single slot and single resource block (RB) is observed, assuming a single DMRS OFDM Symbol, the NR DM-RS is as shown in FIG. 2.

In LTE, the CRS positions in DL subframes are dense and occupy resource elements symbol with slot indices 0, 4, 7 and 11 when 2 CRS ports are configured (denoted as LTE CRS port 0 and 1). In case 4 CRS ports are configured, the CRS occupy symbols with slot indices 0, 1, 4, 7, 8 and 11. However, in the case with 4 ports being configured, the third and fourth port (CRS port 2 and 3) is only used when receiving PDSCH and not for mobility measurements as these measurements are defined on LTE port 0 and 1 only. An example of LTE CRS positions is depicted in FIG. 3.

For transmission modes 9 and 10 in LTE, which are most useful for MU-MIMO, the DM-RS pattern in a physical RB (PRB) pair is as shown in FIG. 4.

It is possible to operate a NR carrier and LTE carrier in the same frequency band, known as NR LTE coexistence. This may also be termed dynamic spectrum sharing (DSS). The terminals connected to LTE carrier are unaware that there is a potential NR transmission when there is no ongoing LTE transmission. The terminals connected to the NR carrier can on the other hand be configured to be aware of a potential overlap with an LTE carrier. Since the LTE CRS cannot be disabled, the slot will not be empty even if there is no LTE traffic.

Hence, when LTE and NR use the same subcarrier spacing, i.e. 15 kHz, NR provides signaling of the positions of the CRS to the NR UE, using at least the RRC parameters lte-CRS-ToMatchAround for the CRS positions and nrofCRS-Ports for the number of CRS ports (1, 2 or 4).

This allows coexistence of LTE and NR on the same carrier as NR PDSCH can be mapped around the LTE CRS.

It is observed that the NR DM-RS in symbol 11=11 collides with the LTE CRS in symbol 11 for PDSCH durations of 13 and 14, hence there is a specified rule in NR Rel.15 that says if lte-CRS-ToMatchAround is configured to the NR UE, then 11=12 is used instead of 11=11 for these PDSCH durations. In this way, the NR DM-RS is not colliding with the LTE CRS and co-existence is achieved.

In MU-MIMO scheduling, there are two possibilities from the network.

1. Transparent MU-MIMO, in which case a transmission to user A is independent of the transmission to user B. User A is not aware of an ongoing MU-MIMO transmission to user B and vice versa. The DM-RS of user A may be interfered by PDSCH and/or DM-RS transmitted to user B and vice versa.

2. Non-transparent MU-MIMO in which case user A is aware of the simultaneous transmission to user B and vice versa and also knows the antenna port (i.e. the DMRS) used to the other user. This allows the UE to estimate the channel of the interfering transmission, coherently, by using the DM-RS. This further allows for improved interference suppression and better performance compared to transparent MU-MIMO.

SUMMARY

In a first aspect a method performed by a wireless device operating in a communications system is provided. The communications system includes the use of radio spectrum shared by a plurality of radio access technologies. The method comprises obtaining a configuration for a demodulation reference signal, DMRS, where the DMRS occupies resource elements identified by a pattern and uses a common resource element of at least two of the plurality of radio access technologies. For example, a DMRS may be configured for a first radio access technology and occupies a same resource element as a DMRS configured for a second radio access technology. The method also includes transmitting or receiving a data transmission based on the obtained demodulation reference signal. In some examples of this aspect, the DMRS is configured for a first radio access technology and is orthogonal or pseudo-orthogonal to a DMRS configured for a different one of the plurality of radio access technologies. The different one of the plurality of radio access technologies may additionally be configured with cell-specific reference signals, CRS. The DMRS may additionally or alternatively comprise a sequence derived by code domain multiplexing, CDM, and using a same DMRS sequence as a DMRS for another user, with at least partially co-scheduled radio resource elements for another one of the plurality of radio access technologies. In some examples the DMRS comprises a time-domain orthogonal cover code, OCC, of length 4 to a group of 4 resource elements; or of length 2 to a group of 2 resource elements. In further examples a length-2 OCC is applied to one of a CDM group, wherein each CDM group corresponds to 2 unique antenna ports or a length-4 OCC is applied to one of a CDM group, wherein each CDM group corresponds to 4 unique antenna ports. In some examples of this aspect, the method further comprises obtaining an antenna port indication. Additionally the antenna port indication may comprise indicating whether other ports within the same CDM group are scheduled. Additionally or alternatively, the indication may comprise the number of CDM groups without physical downlink shared channel data being scheduled. In other examples of this aspect, the CDM may correspond to length-4 OCC in dependence to subcarrier and/or physical resource block indices. In other examples of this aspect, the obtained DMRS configuration may be a first DMRS configuration, the method further comprises obtaining a second DMRS configuration, where the second DMRS is configured for resource elements which are unique from the DMRS and cell-specific reference signals configured for any one of the other radio access technologies. Additionally the method may comprise receiving an indication to select between the first DMRS configuration and the second DMRS configuration.

In some examples of this aspect, the DMRS configuration may be for uplink multi-user, multiple input, multiple output, MU-MIMO.

In a second aspect, a method performed by a network node in a communications system is provided. The communications system includes the use of radio spectrum shared by a plurality of radio access technologies. The method comprises determining a configuration for a demodulation reference signal, DMRS, where the DMRS occupies resource elements identified by a pattern and uses a common resource element of at least two of the plurality of radio access technologies. For example, a DMRS may be configured for a first radio access technology and occupies a same resource element as a DMRS configured for a second radio access technology. The method includes receiving or transmitting a data transmission based on the determined configuration for the demodulation reference signal. In some examples of this aspect, the method comprises configuring a wireless device with the determined configuration for the DMRS. In some examples the DMRS is configured for a first radio access technology and is orthogonal or pseudo-orthogonal to a DMRS configured for a different one of the plurality of radio access technologies. Additionally, the different one of the plurality of radio access technologies may be configured with cell-specific reference signals, CRS. In some examples of this aspect, the DMRS comprises a sequence derived by code domain multiplexing, CDM, and using a same DMRS sequence as a DMRS for another user, with co-scheduled radio resource elements for another one of the plurality of radio access technologies. Additionally the DMRS may comprise a time-domain orthogonal cover code, OCC, of length 4 to a group of 4 resource elements or of length 2 to a group of 2 resource elements. Further, in some examples a length-2 OCC is applied to one of a CDM group, where each CDM group corresponds to 2 unique antenna ports; and a length-4 OCC is applied to one of a CDM group, wherein each CDM group corresponds to 4 unique antenna ports. In some examples of this aspect, the method further comprises sending to the wireless device an antenna port indication. Additionally, the antenna port indication may comprise indicating whether other ports within the same CDM group are scheduled. Additionally or alternatively, the indication comprises the number of CDM groups without physical downlink shared channel data being scheduled. In some examples of this aspect, the CDM corresponds to length-4 OCC in dependence to subcarrier and/or physical resource block indices. In some examples of this aspect, the determined DMRS configuration is a first DMRS configuration, the method further comprises determining a second DMRS configuration, wherein the second DMRS is configured for resource elements which are unique from the DMRS and cell-specific reference signals configured for any one of the other radio access technologies. Additionally, in some examples, the method comprises sending to a wireless device an indication to select between the first DMRS configuration and the second DMRS configuration. In some examples of this aspect, the DMRS configuration is for uplink multi-user, multiple input, multiple output, MU-MIMO.

In another aspect a wireless device is provided. The wireless device comprising processing circuitry, transceiver circuitry, memory and power supply circuitry configured to supply power to the wireless device. The processing circuitry is configured to obtain a configuration for a demodulation reference signal, DMRS, wherein the DMRS comprises a pattern using common resource elements of at least two of the plurality of radio access technologies. The processing circuitry is also configured to receive or transmit a data transmission based on the obtained demodulation reference signal. In some examples the processing circuitry is further configured to perform any one of the methods of the first aspect.

In another aspect a network node is provided. The network node comprising processing circuitry, transceiver circuitry and power supply circuitry configured to supply power to the network node. The processing circuitry is configured to determine a configuration for a demodulation reference signal, DMRS, wherein the DMRS comprises a pattern using common resource elements of at least two of the plurality of radio access technologies. The processing circuitry is also configured to receive or transmit a data transmission based on the determined demodulation reference signal. In some examples the processing circuitry is further configured to perform any one of the methods of the second aspect.

In another aspect, a computer program is provided. The computer program comprising instructions which when executed on a computer or processing circuitry cause the computer or processing circuitry to perform any one of the methods of the first or second aspects.

In another aspect computer program product, memory, or carrier comprising computer program instructions according to the computer program described above.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

It is a problem how to introduce MU-MIMO scheduling between LTE UE using TM 9 or 10 and NR UE when LTE CRS pattern is configured to the NR UE since the LTE DM-RS pattern collides with the NR DM-RS pattern in symbol 11=12.

Figure 5:
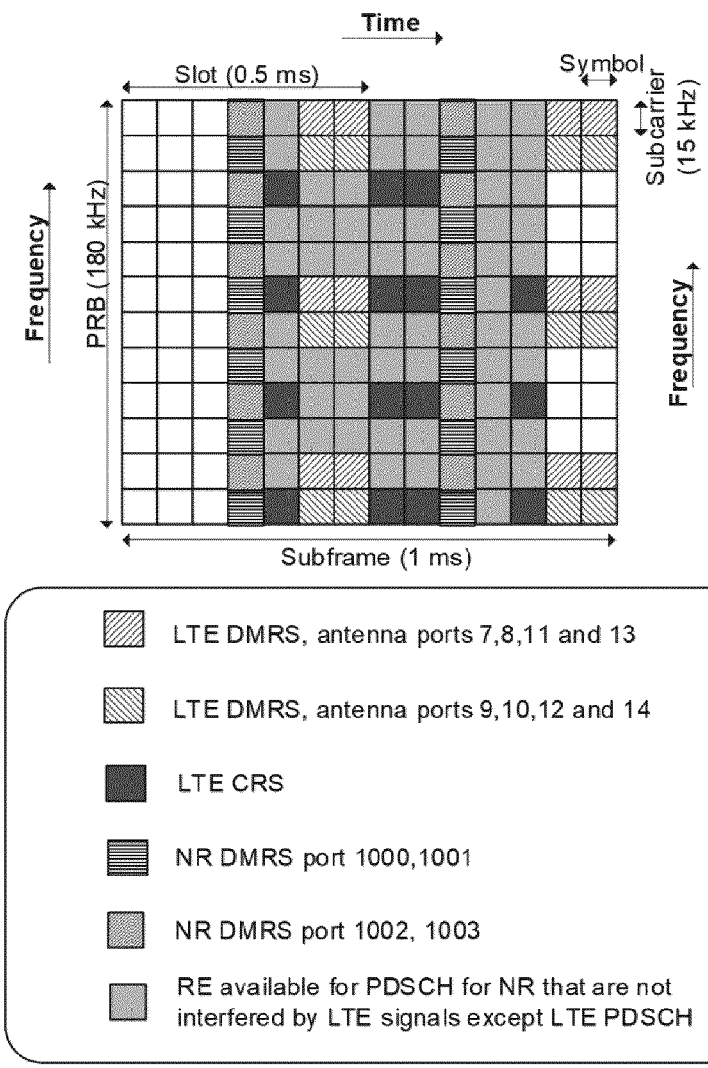
FIG. 5 depicts example DMRS and CRS configurations with LTE and NR coexistence.

One remedy would be to schedule a shorter length NR PDSCH in which case NR DM-RS appears in symbol 9 however, then NR cannot utilize the whole slot and spectral efficiency reduces for NR which is a problem. See FIG. 5 for an overview of the RS positions in the slot for NR and LTE reference signals.

Another problem is the interference on LTE DM-RS by the NR PDSCH transmission and the interference in NR DM-RS from the LTE PDSCH transmission. Furthermore, the benefits of non-transparent MU-MIMO cannot be achieved since the NR UE is not aware of the positions of the co-scheduled (MU-MIMO scheduled) LTE DM-RS.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. For example, the network node may be a satellite gateway or a satellite based base station, e.g. gNB. Other examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

As used herein, wireless device refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements, and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

The present application describes embodiments which address at least some of the previously disclosed problems arising from coexistent scheduling between different radio access technologies and using multi-user MIMO. Two example radio access technologies (RATs) where coexistence is desired are 3GPP Long Term Evolution (LTE) and 3GPP New Radio (NR), however the concepts and proposed embodiments described herein are not limited to such RAT types. For example, for NR, a new DM-RS type can be configured to the UE from the network that use the same resource elements for DM-RS within a PRB as the LTE DM-RS.

With the proposed solution, the following MU-MIMO (i.e. co-scheduling two or more UEs on overlapping time/frequency resources) operations are supported:
1. MU-MIMO between one or more LTE UE(s) and one or more NR UE(s) that are configured with a new DM-RS type
   a. Where NR DM-RS can be configured so that the NR and LTE DM-RS antenna ports used in the MU-MIMO scheduling are orthogonal, or pseudo-orthogonal
   b. Where NR bandwidth part for the NR UE can be larger than the LTE system bandwidth.
2. MU-MIMO between NR UE that is not supporting the new DM-RS type and a NR UE configured with the new DM-RS type for enabling MU-MIMO with LTE UE.

Some advantages are that interference on LTE DM-RS from NR PDSCH is removed, interference in NR DM-RS from LTE PDSCH is removed, NR UE can obtain the benefits of non-transparent MU-MIMO since the NR UE can estimate the channel used for the interfering transmission to an LTE UE and NR overhead is reduced.

DM-RS for PDSCH, i.e. for the gNB to UE transmission

In some embodiments the network may configure the NR UE with a new DM-RS pattern (here referred to as DMRS Type 3), which is not available to UEs of earlier NR Releases (e.g. Rel-15). This new NR DM-RS type is applied to a NR UE configured with OFDM with 15 kHz subcarrier spacing and normal cyclic prefix. Note that LTE only supports 15 kHz subcarrier spacing The new NR DM-RS pattern use the same resource elements as the LTE DM-RS TM10 pattern.

In some embodiments newly defined DM-RS are assigned to NR UEs that are orthogonal, or pseudo-orthogonal, to LTE DM-RS. Orthogonality towards LTE DM-RS is obtained via code domain multiplexing (CDM) in terms of applying time-domain Orthogonal Cover Code (OCC) of length 4 to a group of 4 resource elements or length 2 to a group of 2 resource elements.

A prerequisite for using CDM is that the new NR DM-RS uses the same sequence, i.e. r(m), as the sequence used for the LTE DM-RS on the co-scheduled resource elements. Co-scheduled resources may also be described as shared radio spectrum or DSS. In some examples co-scheduled resource elements overlap but are not necessarily an identical set of resources, i.e. the bandwidth scheduled for one co-scheduled radio access technology may differ from the other radio access technology. In the case of pseudo-orthogonality between DM-RS antenna ports of LTE and NR is used instead, it will be sufficient that the NR DM-RS sequence and LTE DM-RS sequence have low cross-correlations.

Figure 6:
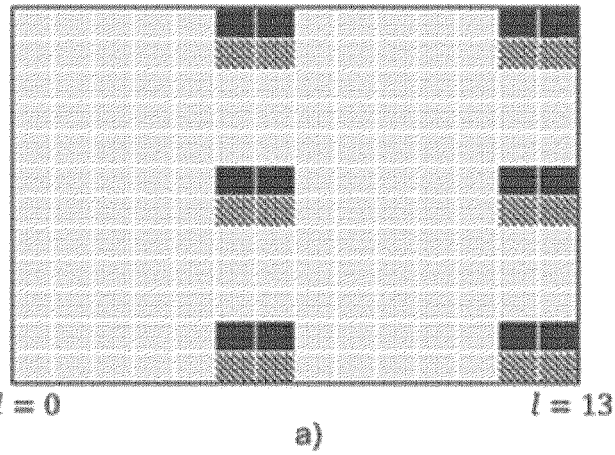
FIG. 6 depicts an example DMRS configuration according to an embodiment of the present disclosure.

Two CDM groups ($\lambda=0,1$) are defined for which length-4 OCC is applied per CDM group. This implies that new DM-RS pattern supports up to 8 orthogonal DM-RS antenna ports, i.e. 4 ports per CDM group. The new NR DM-RS mapping to resource elements is illustrated in FIG. 6, where the eight ports are numbered as, 1000-1007. Also shown is the port numbering of the LTE DM-RS.

In one example of the DM-RS Type 3 mapping, NR operates with same bandwidth as LTE, $N_{RB}^{max,DL}$, has the same centre frequency as LTE and use the same DM-RS sequence, r(m), as LTE DM-RS. Then, the DM-RS Type 3 mapping of antenna port p to resource elements is according to:

$$\alpha_{k,l}^{(p)} = w_p(l') \cdot r(3 \cdot l' \cdot N_{RB}^{max,DL} + 3 \cdot n_{PRB} + k')$$

where $$w_p(l') = \begin{cases} \bar{w}_p(l') & (k' + n_{PRB}) \bmod 2 = 0 \\ \bar{w}_p(3 - l') & (k' + n_{PRB}) \bmod 2 = 1 \end{cases}$$

$$k = 5 \cdot k' + 12 \cdot n_{PRB} + 1 - \Delta_p$$

$$l = l' \bmod 2 + 5$$

$$k' = 0, 1, 2$$

$$l' = 0, 1, 2, 3$$

where $n_{PRB}$ is the PRB index and where $\bar{w}_p(i)$ and $\Delta_p$ are defined in Table 1.

TABLE 1

Parameters for PDSCH DM-RS configuration type 3.

| Antenna port p | CDM group | $\Delta_p$ | $\bar{w}_p(0)$ | $\bar{w}_p(1)$ | $\bar{w}_p(2)$ | $\bar{w}_p(3)$ |
|---|---|---|---|---|---|---|
| 1000 | 0 | 0 | +1 | +1 | +1 | +1 |
| 1001 | 0 | 0 | +1 | −1 | +1 | −1 |
| 1002 | 1 | 1 | +1 | +1 | +1 | +1 |
| 1003 | 1 | 1 | +1 | −1 | +1 | −1 |
| 1004 | 0 | 0 | +1 | +1 | −1 | −1 |
| 1005 | 0 | 0 | +1 | −1 | −1 | +1 |
| 1006 | 1 | 1 | −1 | −1 | +1 | +1 |
| 1007 | 1 | 1 | −1 | +1 | +1 | −1 |

It can be noticed that LTE has an unused DC subcarrier in the middle of its spectrum while NR does not. For example, 20 MHz LTE carriers use 1201 subcarriers (100 RB×12 subcarrier/RB+1 DC subcarrier) while an NR carrier with 100 RB only uses 1200 subcarrier. This means that LTE and NR RB can be aligned on one side of the LTE DC subcarrier, but not on the other side, see FIG. 8. The DM-RS pattern within an NR RB below and above the LTE DC subcarrier should therefore be different (shifted by one subcarrier). This would then enable alignment between DM-RS between LTE and NR on both sides of DC subcarrier.

Using the same sequence family between LTE DM-RS and NR Type 3 DM-RS provides additional benefits. To enable this, the following is needed:

Same DM-RS sequence implies that the same scrambling sequence initialization function and generator as in LTE is used for the new NR DM-RS, i.e. the reference signal sequence, r(m), is generated as in 36PP TS 36.211 V15.7.0:

$$r(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, 4 \cdot 3 \cdot N_{RB}^{max,DL} - 1$$

with the Gold-31 pseudo-random sequence c(i) being initialized as $$c_{init} = (\lfloor n_s/2 \rfloor + 1) \cdot (2n_{ID}^{(nSCID)} + 1) \cdot 2^{16} + n_{SCID}$$

where the parameter ns is the LTE slot counter. Since an NR slot equals the length of two LTE slots in the case of 15 kHz subcarrier spacing, an equivalent initialization with NR slot counter $n_{s,f}^\mu$ can be expressed as $$c_{init} = (n_{s,f}^\mu + 1) \cdot (2n_{ID}^{(nSCID)} + 1) \cdot 2^{16} + n_{SCID}$$

Moreover, a new DMRS scrambling seed (N_ID), e.g. initial value used to calculate the scrambling sequence, using 10 bits is introduced, specific for DMRS type 3, so as to align with the DM-RS scrambling seed used in LTE in order to be able to generate exactly the same sequence for a NR DM-RS that is used for the LTE DM-RS.

NR supports larger scheduling bandwidths than the 20 MHz system bandwidth of LTE so there is a need to support NR DM-RS Type 3 sequence of lengths larger than $12 \cdot N_{RB}^{max,DL}$ but where a segment of the sequence is identical to the LTE DM-RS sequence.

In one embodiment, a new reference point for the subcarrier k used for the NR DM-RS sequence generation is introduced in order to align the LTE and NR DM-RS sequences to ensure that a NR UE can use the LTE DM-RS used for transmission to a co-scheduled LTE UE, or an NR UE using Type 3 DM-RS, in order to estimate the interfering channel (non-transparent MU-MIMO).

One example of introducing such reference point to an NR DM-RS Type 3 sequence $\tilde{r}(\tilde{m})$ is as illustrated by the following sequence $$\{\tilde{r}(0), \tilde{r}(1), \ldots, \tilde{r}(m_0), \tilde{r}(m_0+1), \ldots, \tilde{r}(m_0+12 \cdot N_{RB}^{max,DL}-1), \ldots, \tilde{r}(12 \cdot M_{RB}^{PDSCH}-1)\}$$

where $\tilde{r}(m_0+m) = r(m)$. The value of $m_0$ would depend on the number of NR PRBs that are below LTE PRB index $n_{PRB}=0$.

MU-MIMO in LTE is supported for DM-RS antenna ports associated with CDM group 0 only, and where PDSCH will be mapped to resource elements associated with CDM group 1, so MU-MIMO between NR and LTE UEs is restricted to sharing 4 orthogonal DM-RS ports in a coordinated way. For example, if antenna port 1000 is used to schedule one NR UE then the antenna ports 8, 11, 13 can be used to schedule LTE UE(s), and if antenna ports 1000, 1001 are used to schedule NR UE(s) then the antenna ports 11,13 can be used to schedule LTE UE(s), etc.

In one embodiment, antenna port indication is created for NR DM-RS Type 3 to allow scheduling a single layer, or two layers, to a NR UE using the antenna ports 1000 and 1001 in conjunction by indicating whether other ports within CDM group 0 is used and whether the number of DM-RS CDM groups without PDSCH equals 1 or 2.

In another embodiment, the antenna port indication is created for NR DM-RS Type 3 to allow scheduling a single layer to a NR UE using any of the eight antenna ports 1000-1007. Likewise, the antenna port indication allows to schedule two layers to a NR UE using any of antenna port pairs {1000,1001}, {1004,1005}, {1002,1003}, {1006, 1007}. Hence, this enables more MU-MIMO capacity when only NR UEs are being spatially multiplexed.

The antenna port indication of ports from CDM group 0 are accompanied with indications of the number of DM-RS CDM groups without PDSCH. A UE being scheduled data using antenna ports from CDM group 1 can assume that PDSCH is not mapped to resource elements associated with CDM group 0. A UE being scheduled data mapped on antenna port(s) from the set {1000,1001}, or the set {1002, 1003}, is accompanied with indications whether ports from the set {1004,1005}, or the set {1006,1007}, are used for transmissions to other users. However, a UE being scheduled 3- or 4-layer transmissions using antenna ports indicated from the set {1000,1001} and {1002,1003} can assume SU-MIMO.

There are at least two advantages with non-transparent MU-MIMO. One advantage is that a UE being scheduled a single layer transmission on either antenna port 1000 or 1001 and knows that the antenna ports 1004 and 1005 are not used can resolve the length-4 OCC as being a length-2 OCC. This makes the demodulation more robust to time-varying radio channels. Another advantage is that a UE with an advanced receiver (e.g. a successive interference cancellation, SIC, receiver) can more efficiently cancel cross-layer interference originating from transmissions to other users.

In another embodiment, the NR DM-RS sequence is generated as in TS 38.211 resulting in pseudo-orthogonal DM-RS between NR DM-RS Type 3 and LTE DM-RS. In one version of this embodiment, a length-4 OCC is applied to CDM groups as in TS 36.211 implying a dependency to subcarrier and PRB indices. In another version of this embodiment, a length-4 OCC is applied to CDM groups without a dependency to subcarrier and PRB indices.

In yet another embodiment, a NR UE configured with DM-RS Type 3 can in addition be configured with at least one Rel-15 DM-RS type. This enables MU-MIMO between NR UEs that do not support DM-RS Type 3 (such a legacy NR UEs) and LTE UEs. The selection between the DM-RS Type 3 and the other DM-RS type is done dynamically via DCI.

Figure 7:
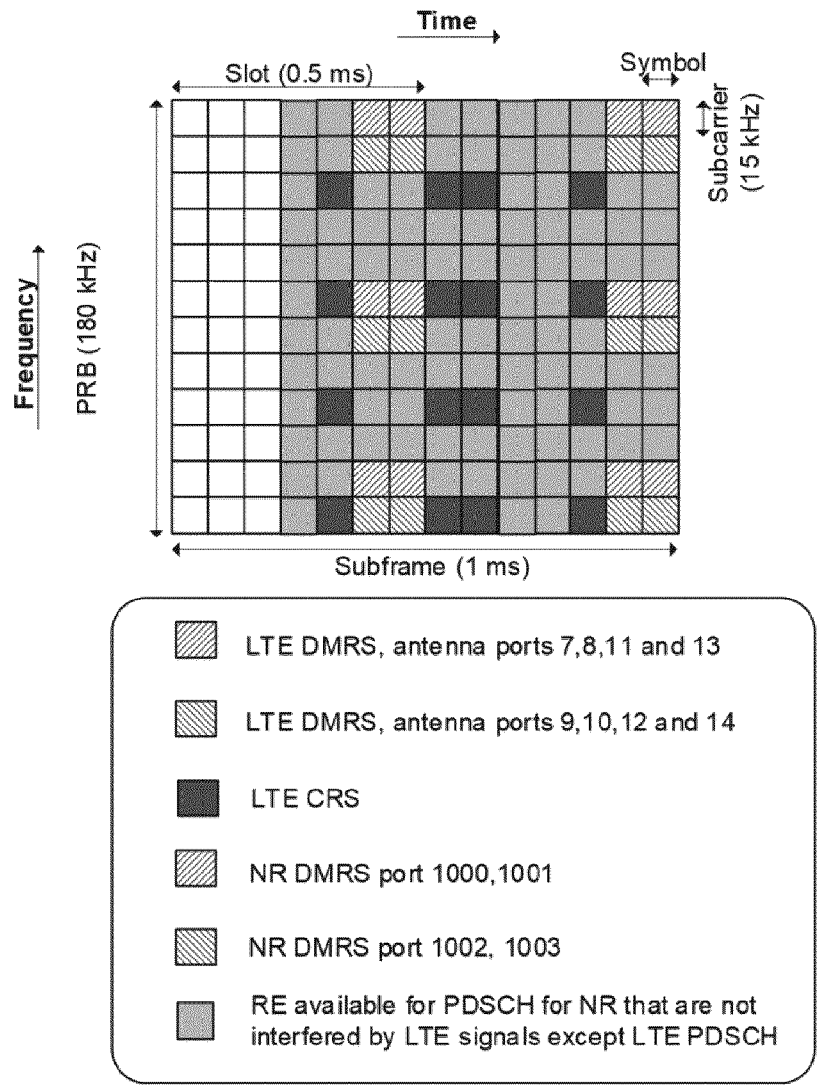
FIG. 7 depicts a further example DMRS configuration according to an embodiment of the present disclosure.

In FIG. 7, the DMRS used by the NR PDSCH demodulation is shown together with the LTE CRS which the PDSCH is not mapped to (i.e. PDSCH is rate matched around the LTE CRS). LTE NR coexistence for MU-MIMO and location of reference signals when a new NR DM-RS (Type 3) use the LTE DM-RS definition.

Figure 8:
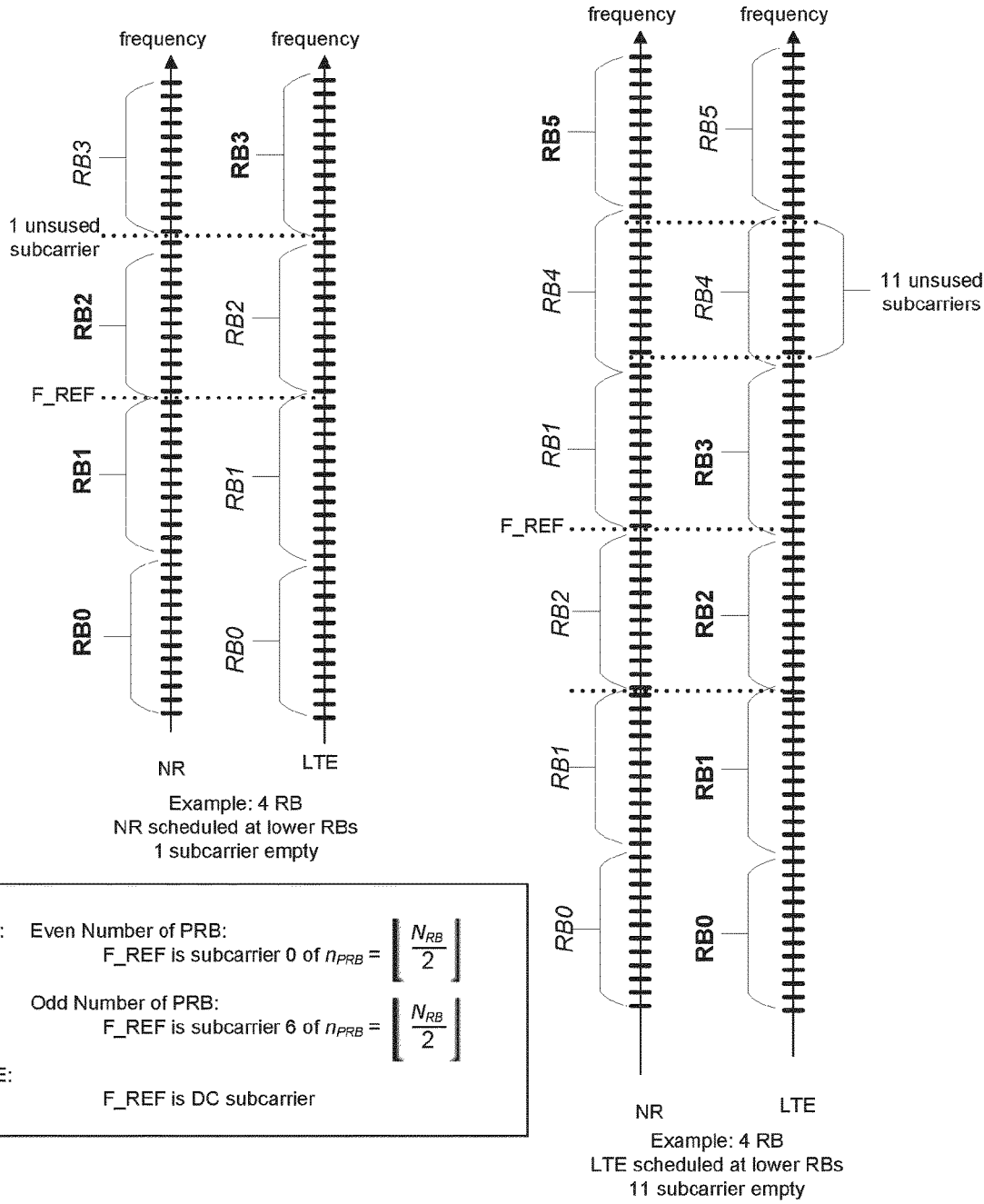
FIG. 8 illustrates an example of resource scheduling, in accordance with some embodiments of the present disclosure.

As mentioned in the beginning of this section, LTE uses a DC subcarrier while NR does not which leads to misaligned RB boundaries on one side of the DC subcarrier, see FIG. 8. When co-scheduling LTE and NR users in MU-MIMO mode, it could be beneficial to align the NR and LTE RB, for example leave the RB that only partially overlaps the RB used for MU-MIMO RBs as empty In the above description focus on the DL. However, MU-MIMO is also possible in the UL where the same UL time-frequency resources are simultaneously used by multiple users. Also here it can be beneficial to be able to configure an NR user with DM-RS that are orthogonal to LTE DM-RS, e.g. DM-RS for DFT-spread PUSCH. LTE can be configured with DM-RS whether on a comb (every other subcarrier) or on all subcarriers. First step is to make sure LTE and NR DM-RS are mapped to the same resource elements. Furthermore LTE always uses an UL shift of 7.5 kHz, in NR this can be configured and needs to be configured here.

In LTE UL DM-RS are based on Zadoff-Chu root sequences and cyclic shifts thereof.

The LTE UL DM-RS occur in symbols 3 and 10 of an LTE subframe, NR DM-RS must therefore occur at the same symbols, i.e. in symbols 3 and 10 of an NR slot.

The cyclic shift of the Zadoff-Chu sequence is given by:

$$n_{cs} = (n_{DMRS}^{(1)} + n_{DMRS}^{(2)} + n_{PRS}(n_s)) \bmod 12$$

in LTE where $n_{DMRS}^{(1)}$ and $n_{DMRS}^{(2)}$ are RRC configured and indicated in DCI, respectively. The function $n_{PRS}(n_s)$ is a hopping function based on a pseudo random sequence and defined in the LTE specification (Section 5.5.2.1.1, 36.211). The quantity $n_{DMRS}^{(1)} + n_{DMRS}^{(1)}$ could be RRC configured for the NR DM-RS. The same hopping function $n_{PRS}(n_s)$ as in LTE is used in NR, with the only difference that $n_s$ counts NR half-slots. The init value of the pseudo random generator for $n_{PRS}(n_s)$ can be RRC configured to the NR UE.

The root sequence index of the Zadoff-Chu may hop over time (group and sequence hopping). The parameters required to configure the root index and the associated hopping can be RRC configured to the NR UE. If hopping is applied also the same hopping function as in LTE would be used.

Embodiments will now be further explained with the aid of the Figures.

Figure 9:
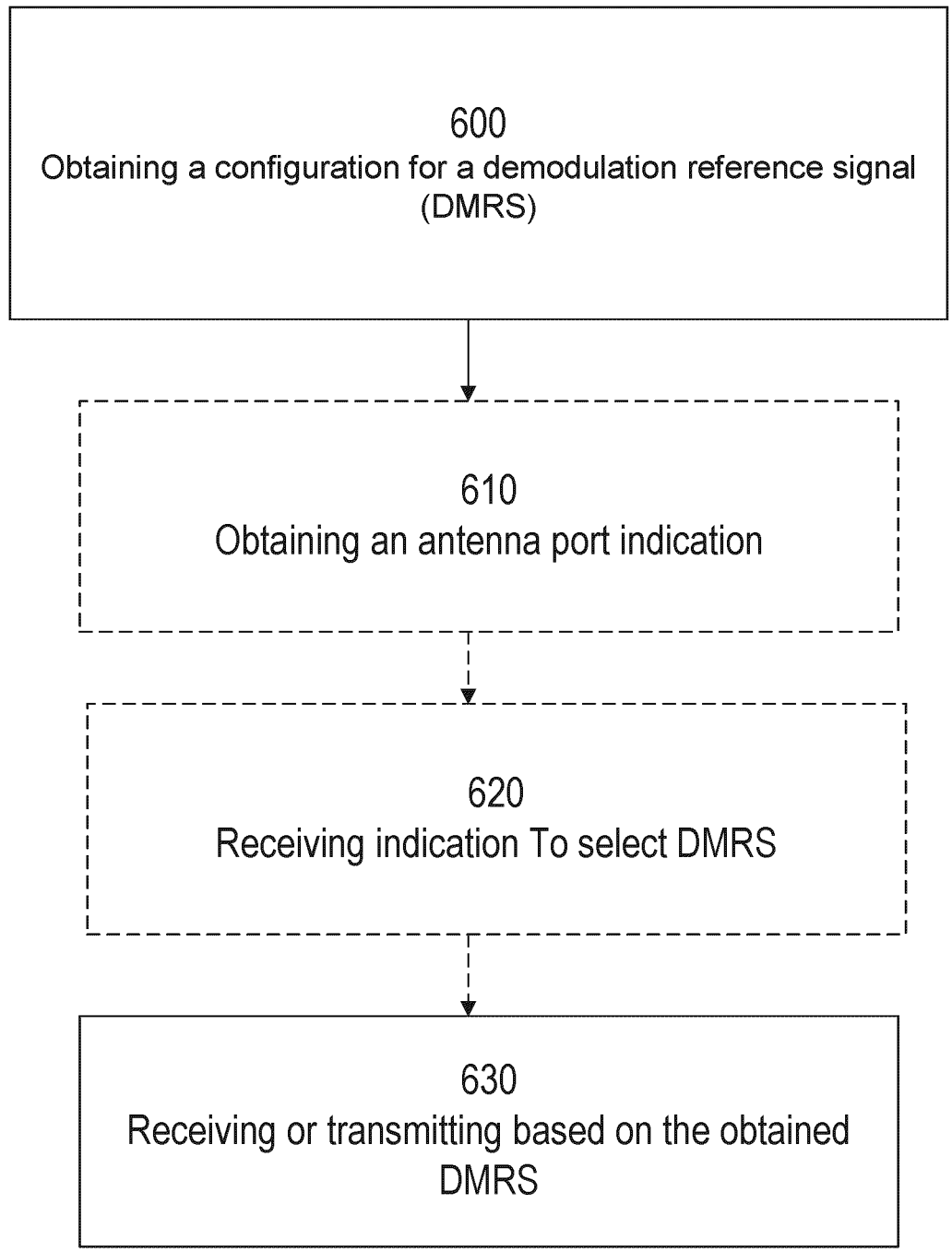
FIG. 9 is a flowchart according to some embodiments of the present disclosure.

FIG. 9 is a flowchart of an example embodiment of a method performed by a wireless device operating in a communications system. The communications system comprises radio spectrum shared by a plurality of radio access technologies, in some examples this is termed co-existence. In other words, the communication system operates with or uses radio spectrum which is shared by more than one radio access technology (RAT) and the communication system uses the more than one RAT in the same communications system. In some examples the plurality of radio access technologies include or are limited to LTE and NR. For example, LTE-NR coexistence. In some examples the communications system supports multi-user multiple input multiple output, MIMO. The method begins at step 600 with the wireless device obtaining a configuration for a demodulation reference signal, DMRS. The DMRS comprises a pattern using common resource elements of at least two of the plurality of radio access technologies. In other words, the DRMS occupies resource elements which are identified by a pattern and at least one of the resource elements identified by the pattern is used or occupied by another radio access type. For example, a DMRS may be configured for a first radio access technology and occupies a same resource element as a DMRS configured for a second radio access technology. For example, the DMRS may use common resource elements for LTE and NR. The method proceeds at step 630 with the wireless device receiving or transmitting a data transmission based on the obtained demodulation reference signal. For example, the wireless device receives PDSCH transmissions on NR whilst co-existing LTE transmissions within the same spectrum/subcarrier range may be scheduled. For example the wireless device demultiplexes the data based on the configured DMRS. In other examples the wireless device uses the DMRS configuration to transmit NR transmissions on PUSCH using spectrum/subcarriers also scheduled for LTE. In some examples the DMRS is configured for a first radio access technology and is orthogonal or pseudo-orthogonal to a DMRS configured for one or more of the plurality of radio access technologies. In some examples the DMRS comprises a sequence derived by code domain multiplexing, CDM, and using a same DMRS sequence as a DMRS for another user, with co-scheduled radio resource elements for another one of the plurality of radio access technologies. In some examples the DMRS comprises a time-domain orthogonal cover code, OCC, of length 4 to a group of 4 resource elements; or of length 2 to a group of 2 resource elements. For example, the OCC is applied on top of the DMRS sequences, in effect creating a new DMRS sequence. In some examples the length-4 OCC is applied to one of a CDM group, wherein each CDM group corresponds to 4 unique antenna ports. In some examples the method further/optionally includes obtaining (610) an antenna port indication. For example, this may be indicated to the wireless device. In some examples this may be indicated by a network node, for example in a radio resource control message, DCI or similar. The antenna port indication may provide an indication whether other ports within the same CDM group are scheduled. In some examples the indication additionally or alternatively indicates the number of CDM groups without physical downlink shared channel data transmissions being scheduled. This is because a UE being scheduled with all ports within a CDM group needs only to know if ports in other CDM groups are scheduled for other users and a UE being scheduled with a subset of ports within a CDM group needs to know if ports in same and other CDM groups are scheduled for other users. In some examples the CDM corresponds to length-4 OCC in dependence to subcarrier and/or physical resource block indices. In some examples the obtained DMRS configuration is a first DMRS configuration, the method further comprising obtaining a second DMRS configuration, wherein the second DMRS is configured for resource elements unique from DMRS and cell-specific reference signals configured for any one of the other radio access technologies. For example, the second DMRS may be an NR Rel-15 DM-RS type. This enables MU-MIMO between NR UEs that do not support the first DMRS (e.g. DM-RS Type 3, such a legacy NR UEs, and LTE UEs. In some examples the method may further include receiving (620) an indication to select between the first DMRS configuration and the second DMRS configuration. For example, this may be indicated dynamically to the wireless device via DCI. In some examples the previous embodiments apply to DL MU-MIMO whereas in other examples the DMRS configuration is for uplink MU-MIMO.

Figure 10:
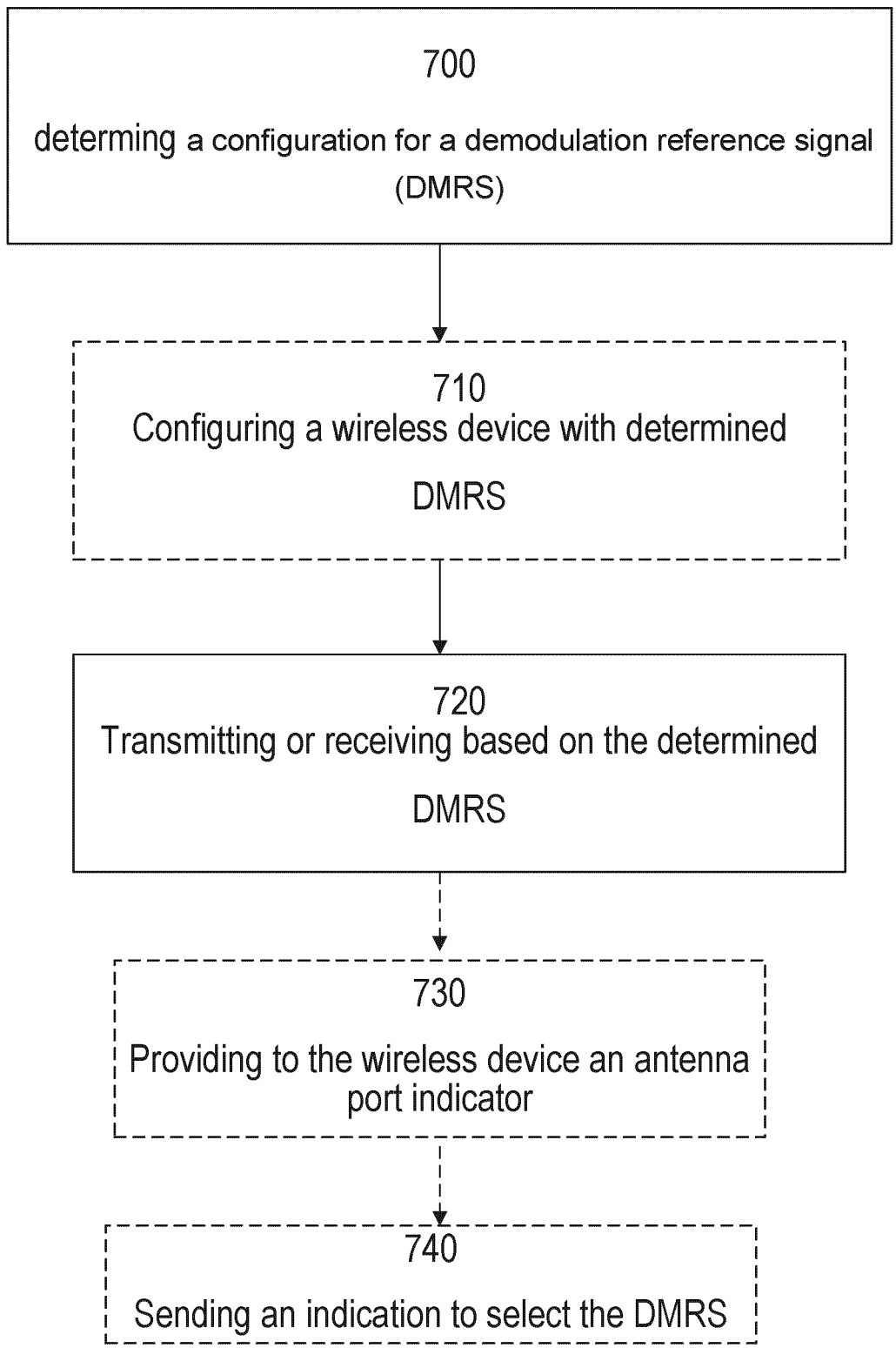
FIG. 10 is a flowchart according to some embodiments of the present disclosure.

FIG. 10 is a flowchart showing an example embodiment of a method performed by a network node in a communications system. The communications system includes providing multi-RAT coexistence, in other words radio spectrum shared by a plurality of radio access technologies, such as LTE-NR coexistence. The method begins with step 700 with the network node determining a configuration for a demodulation reference signal, DMRS. The DMRS comprises a pattern using common resource elements of at least two of the plurality of radio access technologies. In other words, the DRMS occupies resource elements which are identified by a pattern and at least one of the resource elements identified by the pattern is used or occupied by another radio access type. For example, a DMRS may be configured for a first radio access technology and occupies a same resource element as a DMRS configured for a second radio access technology. For example, the DMRS may be configured for resource elements common to both LTE and NR. The method proceeds at step 720 with the network node receiving or transmitting a data transmission based on the determined demodulation reference signal. For example, the network node receives NR transmissions on PUSCH using spectrum/subcarriers also scheduled for LTE. For example, the network node or base station demultiplexes the received PUSCH using the determined DMRS configuration. In other examples the network node uses the determined DMRS configuration to schedule PDSCH transmissions on NR to a wireless device whilst co-existing LTE transmissions within the same spectrum/subcarrier range are being scheduled to other wireless devices. The method optionally includes the step 710 where the network node configures a wireless device with the determined DMRS. For example this may be for a multi-user multiple input multiple output, MIMO, communication. In some examples the DMRS is configured for a first radio access technology and is orthogonal or pseudo-orthogonal to a DMRS configured for one or more of the plurality of radio access technologies. In some examples the DMRS comprises a sequence derived by code domain multiplexing, CDM, and using a same DMRS sequence as a DMRS for another user, with co-scheduled radio resource elements for another one of the plurality of radio access technologies. In some examples the DMRS comprises a time-domain orthogonal cover code, OCC, of length 4 to a group of 4 resource elements; or of length 2 to a group of 2 resource elements. For example the OCC is applied on top of the DMRS sequences, in effect creating a new DMRS sequence. In some examples the length-4 OCC is applied to one of a CDM group, wherein each CDM group corresponds to 4 unique antenna ports. The method may optionally include the step 730 of sending to the wireless device an antenna port indicator. In some examples the antenna port indicator comprises indicating whether other ports within the same CDM group are scheduled to be used. In some examples antenna port indicator comprises indicating the number of CDM groups without physical downlink shared channel data being scheduled. In some examples the CDM corresponds to length-4 OCC in dependence to subcarrier and/or physical resource block indices. In some examples the determined DMRS configuration is a first DMRS configuration, the method further comprising determining a second DMRS configuration, wherein the second DMRS is configured for resource elements unique from DMRS and cell-specific reference signals are configured for any one of the other radio access technologies. For example, the second DMRS may be an NR Rel-15 DM-RS type. This enables MU-MIMO between NR UEs that do not support the first DMRS (e.g. DM-RS Type 3, such a legacy NR UEs, and LTE UEs. In some examples the method may further include sending 740 to the wireless device an indication to select between the first DMRS configuration and the second DMRS configuration. For example, this may be indicated dynamically to the wireless device via DCI. In some examples the previous embodiments apply to DL MU-MIMO whereas in other examples the DMRS configuration is for uplink MU-MIMO Although the subject matter described herein may be implemented in any appropriate type of system using any suitable components, the embodiments disclosed herein are further described in relation to a wireless network, such as the example wireless network or communications system illustrated in FIG. 11. For simplicity, the wireless network of FIG. 11 only depicts network 106, network nodes 160 and 160*b*, and wireless devices 110, 110*b*, and 100*c*. In practice, a wireless network may further include any additional elements suitable to support communication between wireless devices or between a wireless device and another communication device, such as a landline telephone, a service provider, or any other network node or end device. Of the illustrated components, network node 160 and wireless device (wireless device) 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and wireless device 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 1:
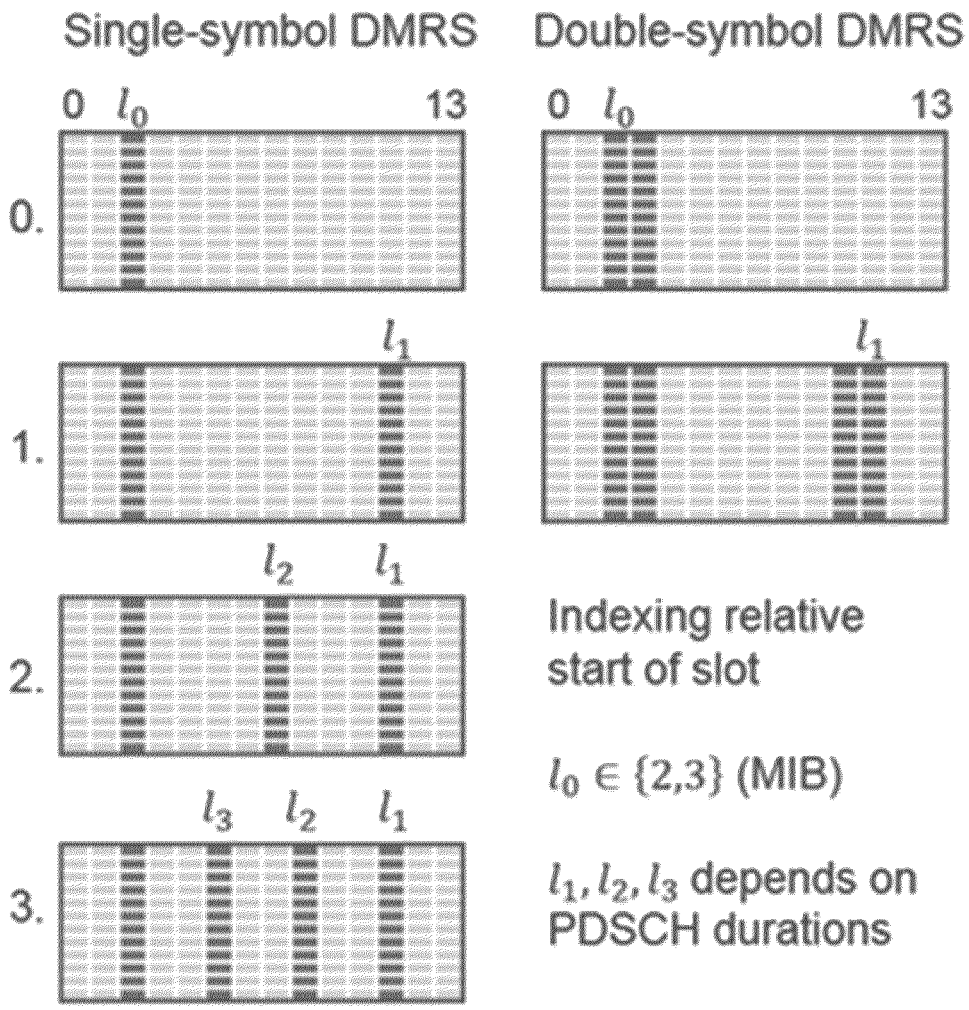
FIG. 1 depicts example DMRS configurations.
Figure 2:
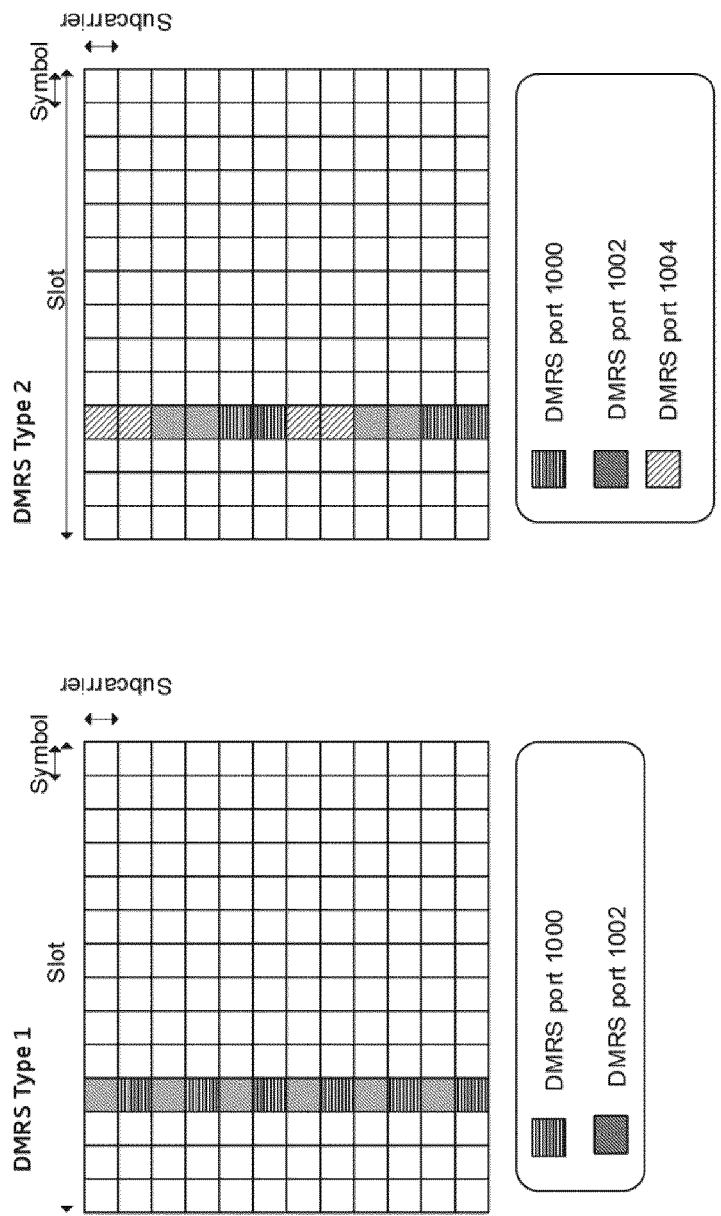
FIG. 2 depicts example DMRS and antenna port configurations.
Figure 3:
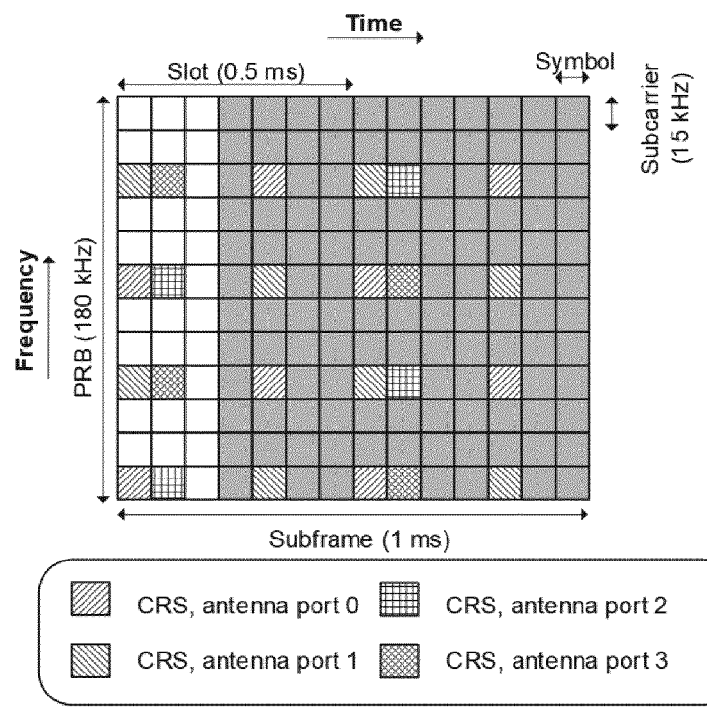
FIG. 3 depicts example LTE CRS positions.
Figure 4:
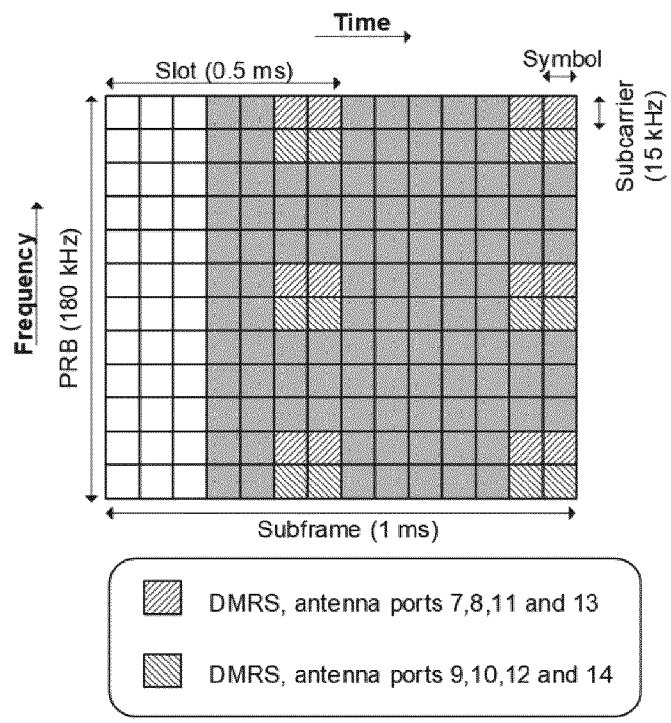
FIG. 4 depicts a further example of DMRS and antenna port configurations.
Figure 11:
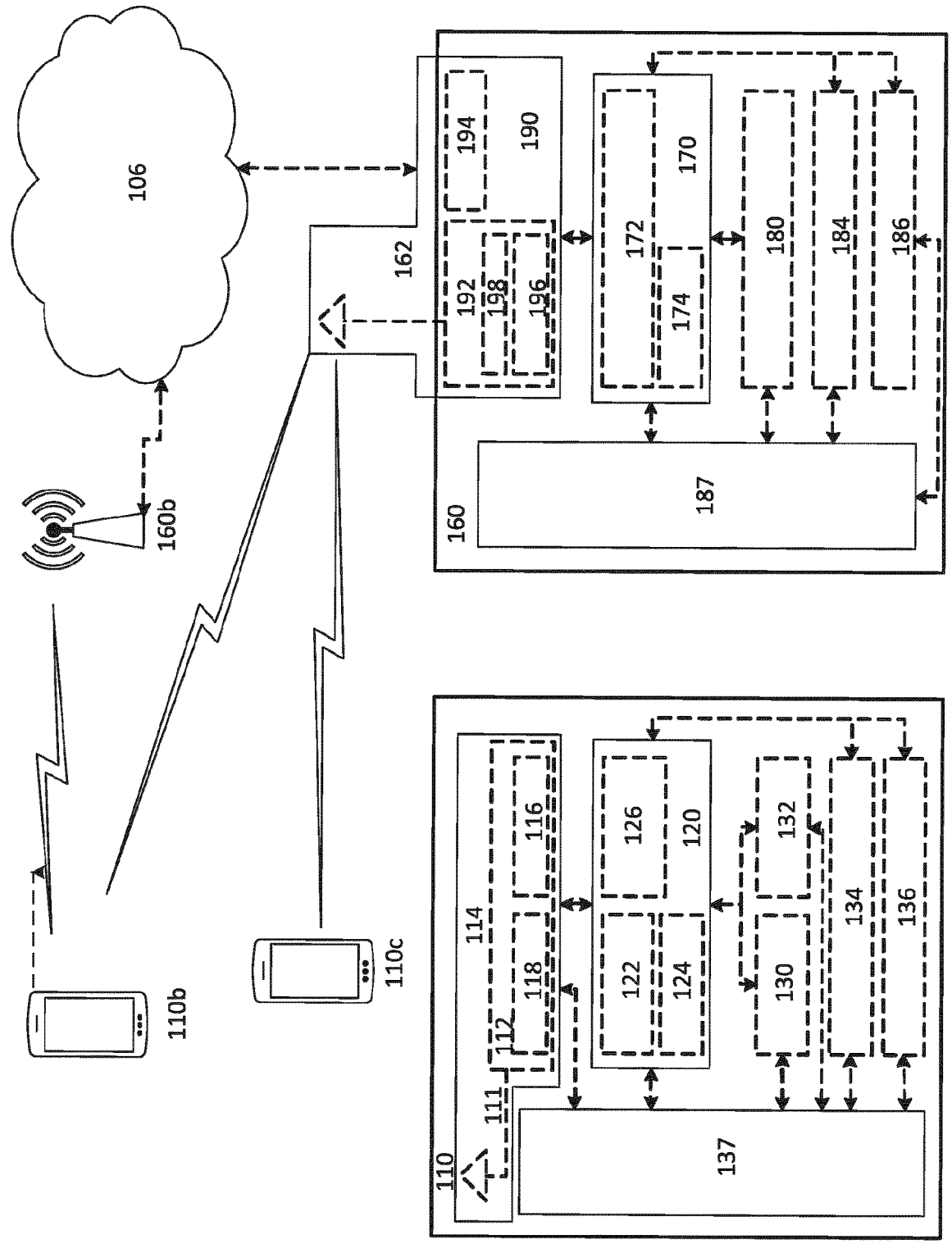
FIG. 11 illustrates an example of communications system, in accordance with some embodiments.

In FIG. 11, network node 160 includes processing circuitry 170, device readable medium 180, interface 190, auxiliary equipment 184, power source 186, power circuitry 187, and antenna 162. As previously described, the network node is connectable to a non-terrestrial network as depicted, for example in FIG. 1. Although network node 160 illustrated in the example wireless network of FIG. 1 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units.

In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. For example, the processing circuitry 170 may be configured to determining a Doppler shift estimate for transmissions between the network node and a wireless device. The processing circuitry may then be configured to transmit a frequency adjustment indication to the wireless device, based on the determined Doppler shift estimate. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or wireless devices 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or wireless devices via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 11 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As illustrated, wireless device 110 includes antenna 111, interface 114, processing circuitry 120, device readable medium 130, user interface equipment 132, auxiliary equipment 134, power source 136 and power circuitry 137. wireless device 110 may include multiple sets of one or more of the illustrated components for different wireless technologies supported by wireless device 110, such as, for example, GSM, WCDMA, LTE, NR, WiFi, WiMAX, or Bluetooth wireless technologies, just to mention a few. These wireless technologies may be integrated into the same or different chips or set of chips as other components within wireless device 110.

Antenna 111 may include one or more antennas or antenna arrays, configured to send and/or receive wireless signals, and is connected to interface 114. In certain alternative embodiments, antenna 111 may be separate from wireless device 110 and be connectable to wireless device 110 through an interface or port. Antenna 111, interface 114, and/or processing circuitry 120 may be configured to perform any receiving or transmitting operations described herein as being performed by a wireless device. Any information, data and/or signals may be received from a network node and/or another wireless device. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120, and is configured to condition signals communicated between antenna 111 and processing circuitry 120. Radio front end circuitry 112 may be coupled to or a part of antenna 111. In some embodiments, wireless device 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or wireless devices via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other wireless device 110 components, such as device readable medium 130, wireless device 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of wireless device 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a wireless device may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. For example, processing circuitry 120 may be configured to obtain a frequency offset corresponding to a Doppler shift of transmission and or reception frequencies between the wireless device and a non-terrestrial network, NTN, comprising a network node and a communication satellite, wherein the network node is one of a terrestrial base station and a satellite base station or satellite gateway. The processing circuitry 120 may then be configured to apply the frequency offset to an uplink transmission to the network node. The benefits provided by such functionality are not limited to processing circuitry 120 alone or to other components of wireless device 110, but are enjoyed by wireless device 110 as a whole, and/or by end users and the wireless network generally.

Processing circuitry 120 may be configured to perform any determining, calculating, or similar operations (e.g., certain obtaining operations) described herein as being performed by a wireless device. These operations, as performed by processing circuitry 120, may include processing information obtained by processing circuitry 120 by, for example, converting the obtained information into other information, comparing the obtained information or converted information to information stored by wireless device 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with wireless device 110. Such interaction may be of many forms, such as visual, audial, tactile, etc. User interface equipment 132 may be operable to produce output to the user and to allow the user to provide input to wireless device 110. The type of interaction may vary depending on the type of user interface equipment 132 installed in wireless device 110. For example, if wireless device 110 is a smart phone, the interaction may be via a touch screen; if wireless device 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into wireless device 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from wireless device 110, and to allow processing circuitry 120 to output information from wireless device 110. User interface equipment 132 may include, for example, a speaker, a display, vibrating circuitry, a USB port, a headphone interface, or other output circuitry. Using one or more input and output interfaces, devices, and circuits, of user interface equipment 132, wireless device 110 may communicate with end users and/or the wireless network, and allow them to benefit from the functionality described herein.

Auxiliary equipment 134 is operable to provide more specific functionality which may not be generally performed by wireless devices. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. wireless device 110 may further comprise power circuitry 137 for delivering power from power source 136 to the various parts of wireless device 110 which need power from power source 136 to carry out any functionality described or indicated herein. Power circuitry 137 may in certain embodiments comprise power management circuitry. Power circuitry 137 may additionally or alternatively be operable to receive power from an external power source; in which case wireless device 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of wireless device 110 to which power is supplied.

Figure 12:
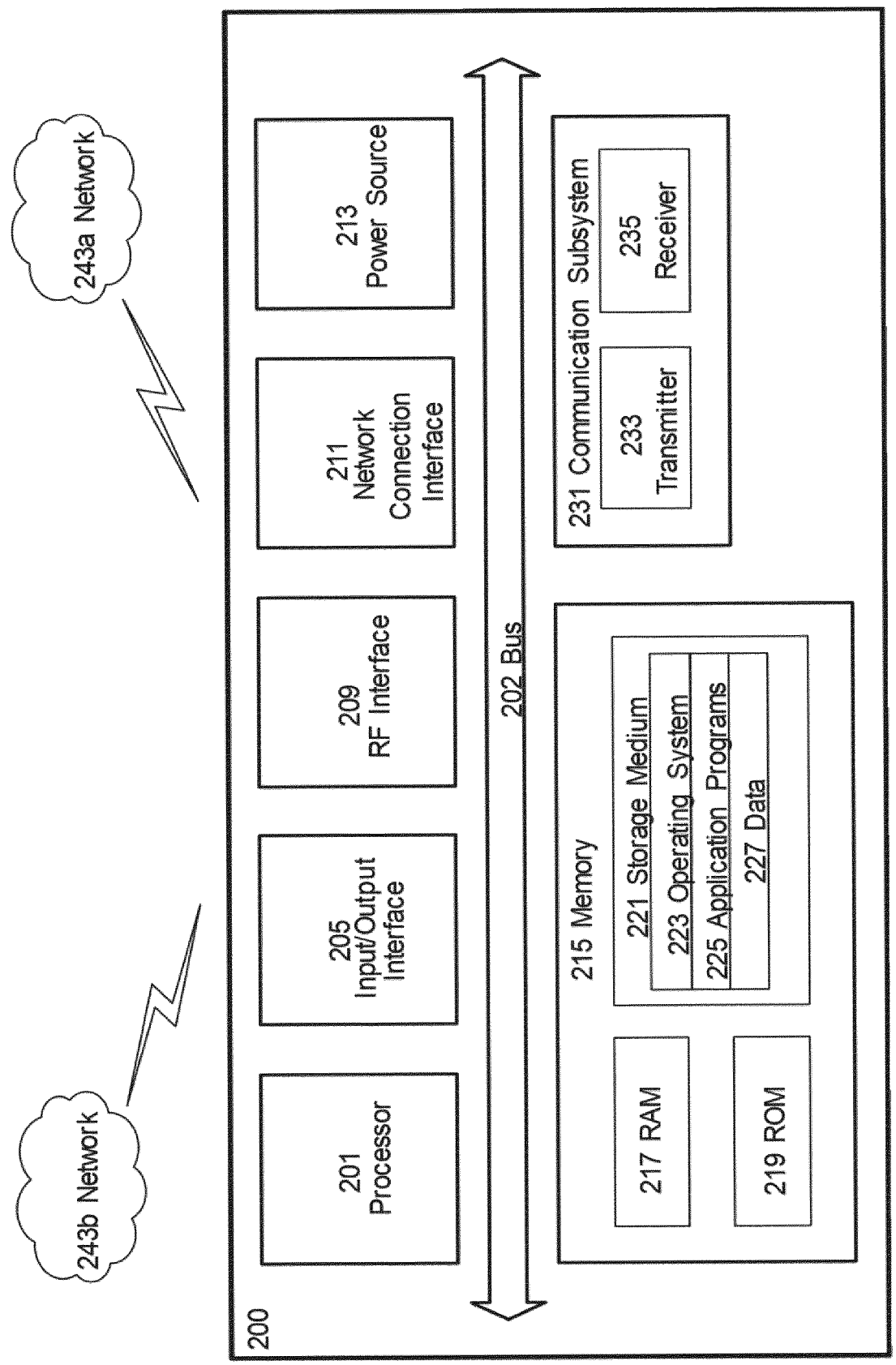
FIG. 12 illustrates an example of User Equipment, in accordance with some embodiments.

FIG. 12 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 2200 may be any UE identified by the 3rd Generation Partnership Project (3GPP), including a NB-IoT UE, a machine type communication (MTC) UE, and/or an enhanced MTC (eMTC) UE. UE 200, as illustrated in FIG. 9, is one example of a wireless device configured for communication in accordance with one or more communication standards promulgated by the 3rd Generation Partnership Project (3GPP), such as 3GPP's GSM, UMTS, LTE, and/or 5G standards. As mentioned previously, the term wireless device and UE may be used interchangeable. Accordingly, although FIG. 9 is a UE, the components discussed herein are equally applicable to a wireless device, and vice-versa.

In FIG. 12, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 9, or only a subset of the components. The level of integration between the components may vary from one UE to another UE. Further, certain UEs may contain multiple instances of a component, such as multiple processors, memories, transceivers, transmitters, receivers, etc.

In FIG. 12, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 12, RF interface 209 may be configured to provide a communication interface to RF components such as a transmitter, a receiver, and an antenna. Network connection interface 211 may be configured to provide a communication interface to network 243*a*. Network 243*a* may encompass wired and/or wireless networks such as a local-area network (LAN), a wide-area network (WAN), a computer network, a wireless network, a telecommunications network, another like network or any combination thereof. For example, network 243*a* may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 12, processing circuitry 201 may be configured to communicate with network 243*b* using communication subsystem 231. Network 243*a* and network 243*b* may be the same network or networks or different network or networks. Communication subsystem 231 may be configured to include one or more transceivers used to communicate with network 243*b*. For example, communication subsystem 231 may be configured to include one or more transceivers used to communicate with one or more remote transceivers of another device capable of wireless communication such as another wireless device, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243*b* may encompass wired and/or wireless networks such as a local-area network (LAN), a wide-area network (WAN), a computer network, a wireless network, a telecommunications network, another like network or any combination thereof. For example, network 243*b* may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 13:
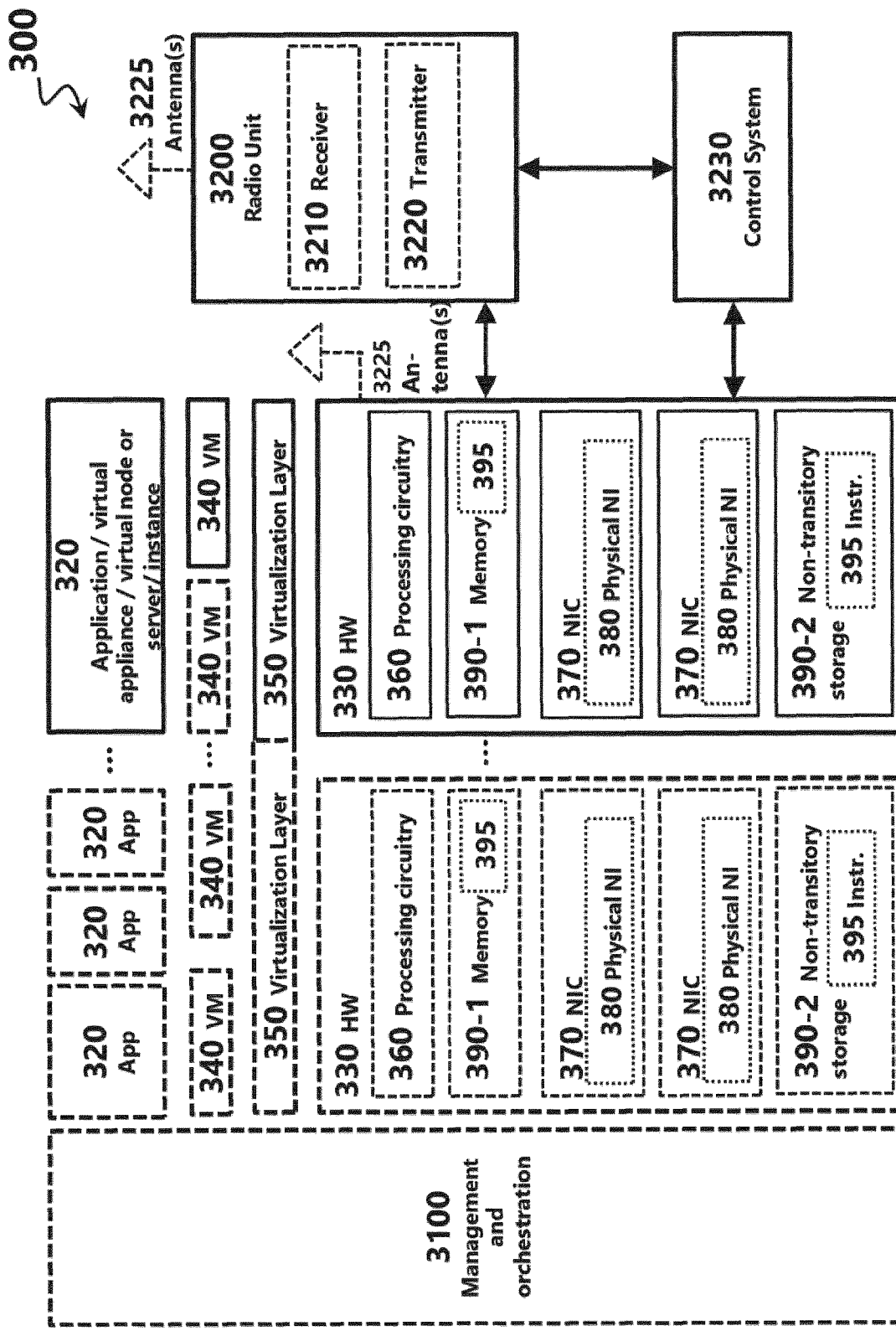
FIG. 13 illustrates an example of a virtualization environment, in accordance with some embodiments.

FIG. 13 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 10, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 10.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signalling can be effected with the use of control system 3230 which may alternatively be used for communication between the hardware nodes 330 and radio units 3200.

Figure 14:
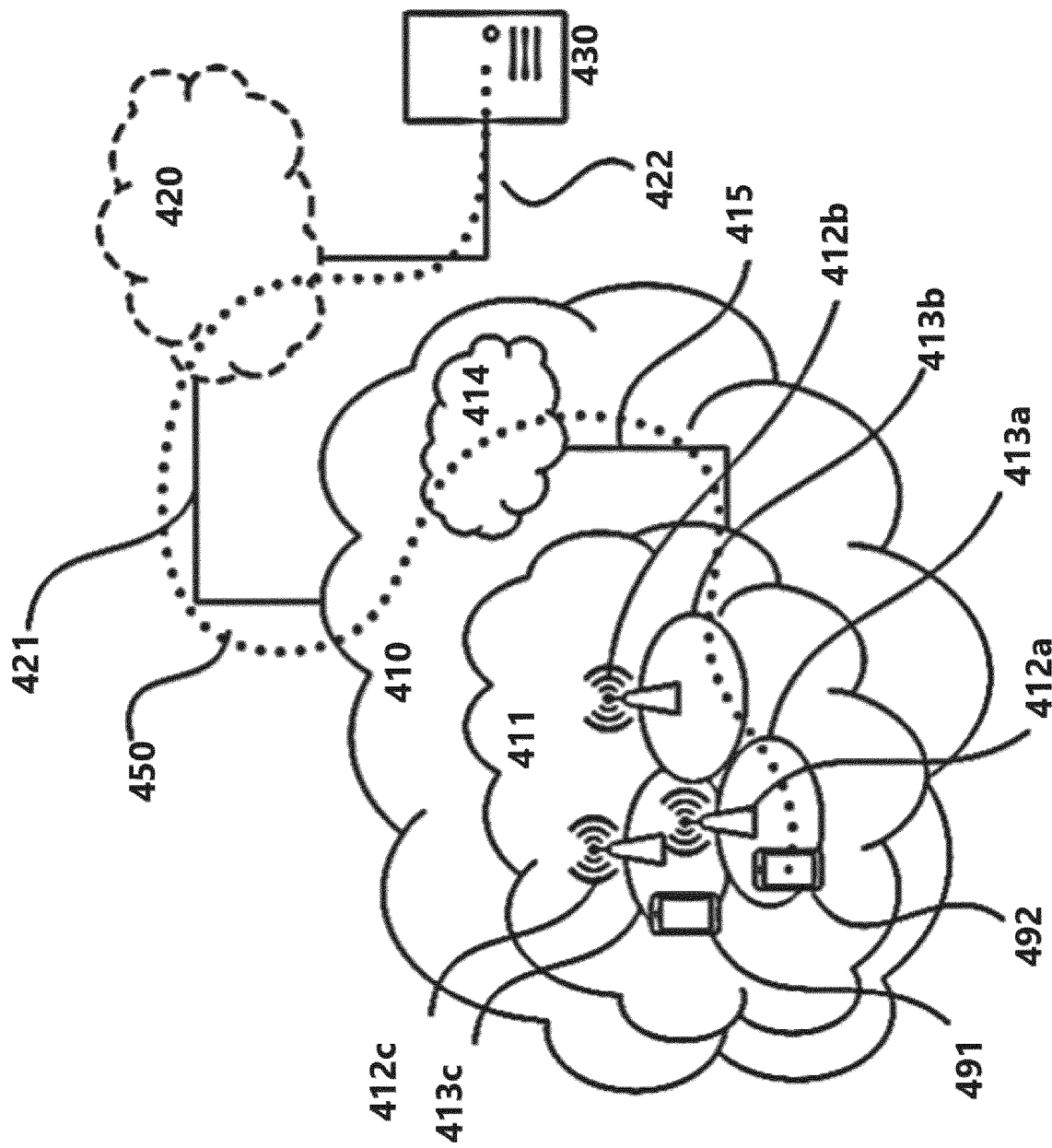
FIG. 14 illustrates an example of a telecommunication network connected via an intermediate network to a host computer, in accordance with some embodiments.

With reference to FIG. 14, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 14 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Example implementations, in accordance with an embodiment, of the UE, base station and host computer discussed in the preceding paragraphs will now be described with reference to FIG. 15. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 12) served by base station 520. Communication interface 526 may be configured to facilitate connection 560 to host computer 510. Connection 560 may be direct or it may pass through a core network (not shown in FIG. 12) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 12 may be similar or identical to host computer 430, one of base stations 412*a*, 412*b*, 412*c* and one of UEs 491, 492 of FIG. 14, respectively. This is to say, the inner workings of these entities may be as shown in FIG. 12 and independently, the surrounding network topology may be that of FIG. 14.

Figure 15:
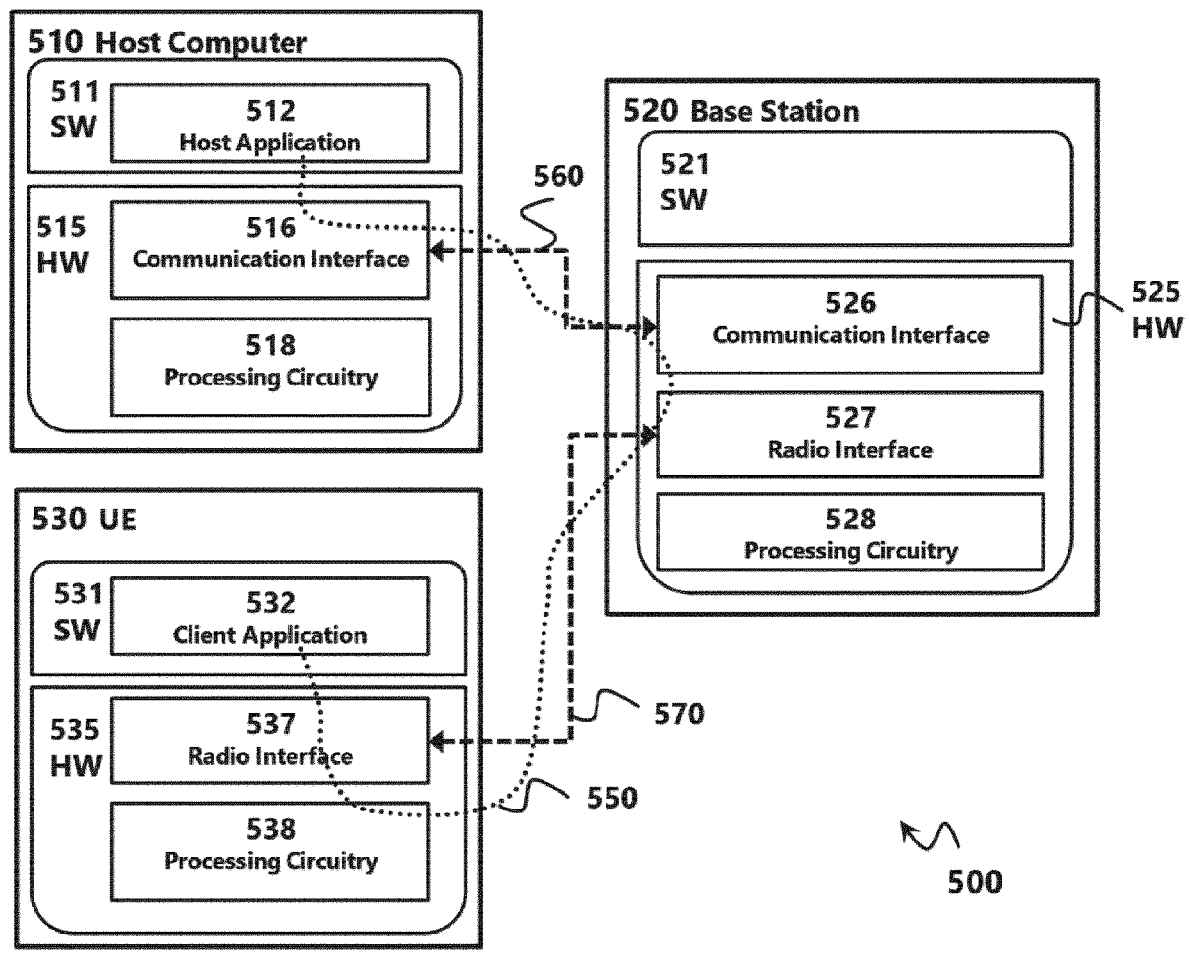
FIG. 15 illustrates an example of a host computer communicating via a base station with a user equipment over a partially wireless connection, in accordance with some embodiments.

In FIG. 15, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the service availability and reliability and thereby provide benefits such as reduced user waiting time and better responsiveness.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figures 16, 17:
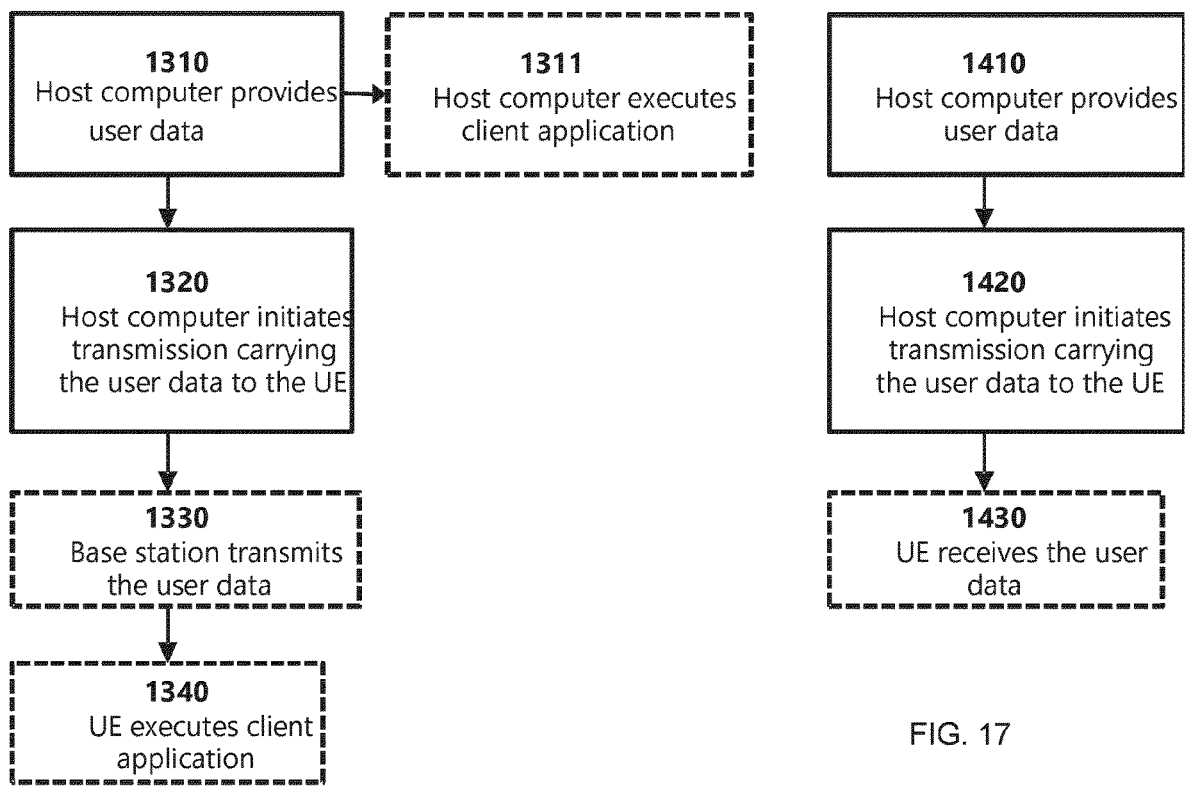
FIG. 16 illustrates an example of methods implemented in a communication system including a host computer, a base station and a user equipment, in accordance with some embodiments.
FIG. 17 illustrates an example of methods implemented in a communication system including a host computer, a base station and a user equipment, in accordance with some embodiments.

FIG. 16 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 16 will be included in this section. In step 1310, the host computer provides user data. In substep 1311 (which may be optional) of step 1310, the host computer provides the user data by executing a host application. In step 1320, the host computer initiates a transmission carrying the user data to the UE. In step 1330 (which may be optional), the base station transmits to the UE the user data which was carried in the transmission that the host computer initiated, in accordance with the teachings of the embodiments described throughout this disclosure. In step 1340 (which may also be optional), the UE executes a client application associated with the host application executed by the host computer.

FIG. 17 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 14 will be included in this section. In step 1410 of the method, the host computer provides user data. In an optional substep (not shown) the host computer provides the user data by executing a host application. In step 1420, the host computer initiates a transmission carrying the user data to the UE. The transmission may pass via the base station, in accordance with the teachings of the embodiments described throughout this disclosure. In step 1430 (which may be optional), the UE receives the user data carried in the transmission.

Figures 18, 19:
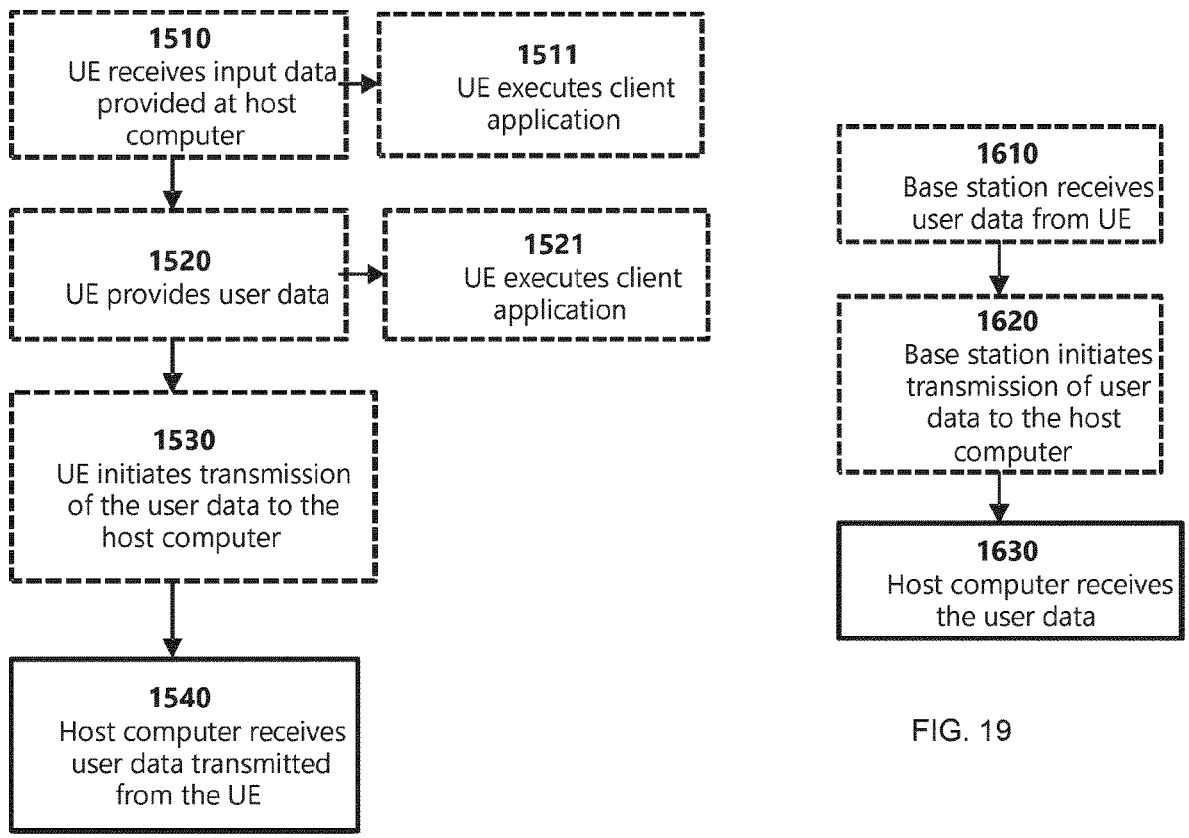
FIG. 18 illustrates an example of methods implemented in a communication system including a host computer, a base station and a user equipment, in accordance with some embodiments.
FIG. 19 illustrates an example of methods implemented in a communication system including a host computer, a base station and a user equipment, in accordance with some embodiments.

FIG. 18 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 15 will be included in this section. In step 1510 (which may be optional), the UE receives input data provided by the host computer. Additionally or alternatively, in step 1520, the UE provides user data. In substep 1521 (which may be optional) of step 1520, the UE provides the user data by executing a client application. In substep 1511 (which may be optional) of step 1510, the UE executes a client application which provides the user data in reaction to the received input data provided by the host computer. In providing the user data, the executed client application may further consider user input received from the user. Regardless of the specific manner in which the user data was provided, the UE initiates, in substep 1530 (which may be optional), transmission of the user data to the host computer. In step 1540 of the method, the host computer receives the user data transmitted from the UE, in accordance with the teachings of the embodiments described throughout this disclosure.

FIG. 19 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 16 will be included in this section. In step 1610 (which may be optional), in accordance with the teachings of the embodiments described throughout this disclosure, the base station receives user data from the UE. In step 1620 (which may be optional), the base station initiates transmission of the received user data to the host computer. In step 1630 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like.

Figure 20:
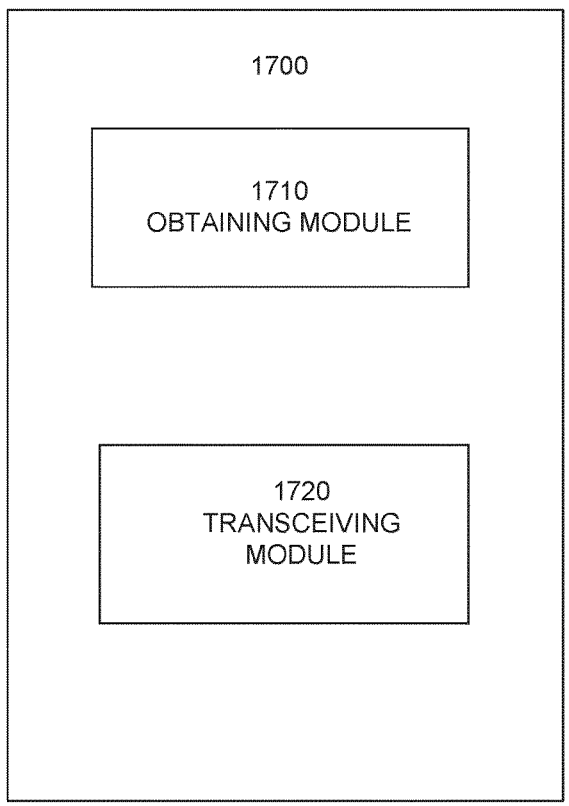
FIG. 20 depicts a UE apparatus in accordance with some embodiments.

In FIG. 20 an example virtual wireless device apparatus 1700 is depicted. The wireless device 1700 comprises an obtaining module 1710 comprising instructions for obtaining a configuration for a demodulation reference signal, DMRS, wherein the DMRS comprises a pattern using common resource elements of at least two of the plurality of radio access technologies. The wireless device 1700 further comprises a transceiving module comprising instructions multiplexing or demultiplexing a transmission or reception based on the obtained demodulation reference signal. The wireless device 1700 may optionally include other program modules comprising instructions to perform any one of the methods described herein, in relation to a wireless device or UE.

Figure 21:
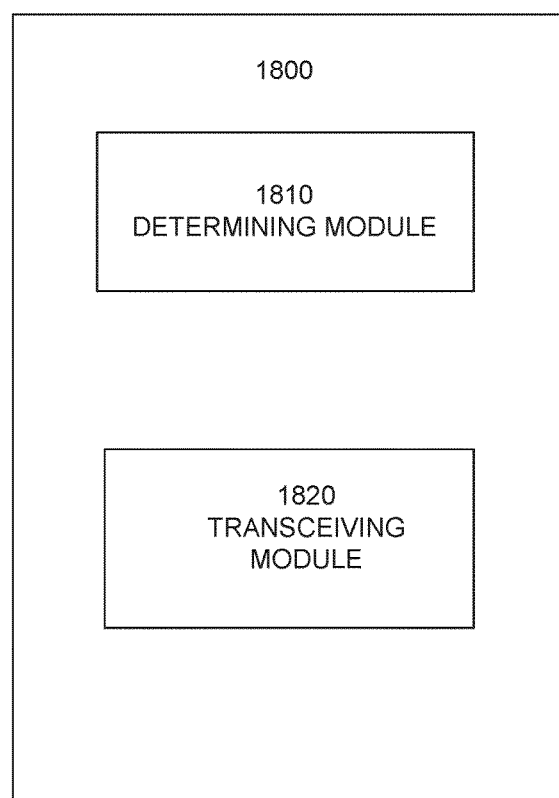
FIG. 21 depicts a UE apparatus in accordance with some embodiments.

In FIG. 21 an example virtual network apparatus 1800 is depicted. The network node 1800 comprises determining module 1810 comprising instructions for determining a configuration for a demodulation reference signal, DMRS, wherein the DMRS comprises a pattern using common resource elements of at least two of the plurality of radio access technologies. The network node 1800 further comprises a transceiving module comprising instructions for multiplexing or demultiplexing a transmission or reception based on the determined demodulation reference signal. The network node 1800 may optionally include other program modules comprising instructions to perform any one of the methods described herein in relation to a network node or base station.

The processing circuitry of the described apparatus may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

In some embodiments a computer program, computer program product or computer readable storage medium comprises instructions which when executed on a computer perform any of the embodiments disclosed herein. In further examples the instructions are carried on a signal or carrier and which are executable on a computer wherein when executed perform any of the embodiments disclosed herein.

Further examples to illustrate one or more embodiments disclosed herein:

Example 1. A method performed by a wireless device operating in a communications system, wherein the communications system comprises radio spectrum shared by a plurality of radio access technologies, the method comprising:

obtaining a configuration for a demodulation reference signal, DMRS, wherein the DMRS comprises a pattern using common resource elements of at least two of the plurality of radio access technologies;

transmitting or receiving a data transmission based on the obtained demodulation reference signal.

Example 2: The method of Example 1, wherein the DMRS is configured for a first radio access technology and is orthogonal or pseudo-orthogonal to a DMRS configured for one or more of the plurality of radio access technologies.

Example 3: The method of Example 2, wherein the DMRS comprises a sequence derived by code domain multiplexing, CDM, and using a same DMRS sequence as a DMRS for another user, with at least partially co-scheduled radio resource elements for another one of the plurality of radio access technologies.

Example 4: The method of Example 3, wherein the DMRS comprises a time-domain orthogonal cover code, OCC, of length 4 to a group of 4 resource elements; or of length 2 to a group of 2 resource elements.

Example 5: The method of Example 4, wherein one of:

a length-2 OCC is applied to one of a CDM group, wherein each CDM group corresponds to 2 unique antenna ports; and a length-4 OCC is applied to one of a CDM group, wherein each CDM group corresponds to 4 unique antenna ports.

Example 6: The method of any one of the preceding Examples, further comprising obtaining an antenna port indication.

Example 7: The method of Example 6, wherein the antenna port indication comprises indicating whether other ports within the same CDM group are scheduled and/or the number of CDM groups without physical downlink shared channel data scheduled.

Example 8: The method according to any one of the preceding Examples, wherein the CDM corresponds to length-4 OCC in dependence to subcarrier and/or physical resource block indices.

Example 9: The method according to any one of the preceding Examples, wherein the obtained DMRS configuration is a first DMRS configuration, the method further comprising obtaining a second DMRS configuration, wherein the second DMRS is configured for resource elements unique from DMRS and cell-specific reference signals configured for any one of the other radio access technologies.

Example 10: The method according to embodiment 9, further comprising receiving an indication to select between the first DMRS configuration and the second DMRS configuration.

Example 11: The method according to any one of the preceding Examples wherein the DMRS configuration is for uplink multi-user, multiple input, multiple output, MU-MIMO.

Example 12: A method performed by a network node in a communications system, wherein the communications system comprises radio spectrum shared by a plurality of radio access technologies, the method comprising:

determining a configuration for a demodulation reference signal, DMRS, wherein the DMRS comprises a pattern using common resource elements of at least two of the plurality of radio access technologies;

receiving or transmitting a data transmission based on the determined demodulation reference signal.

Example 13: The method of Example 12, further comprising:

configuring a wireless device with the determined DMRS.

Example 14: The method of Example 12 or 13, wherein the DMRS is configured for a first radio access technology and is orthogonal or pseudo-orthogonal to a DMRS configured for one or more of the plurality of radio access technologies.

Example 15: The method of any one of Examples 12-14, wherein the DMRS comprises a sequence derived by code domain multiplexing, CDM, and using a same DMRS sequence as a DMRS for another user, with co-scheduled radio resource elements for another one of the plurality of radio access technologies.

Example 16: The method of Example 15, wherein the DMRS comprises a time-domain orthogonal cover code, OCC, of length 4 to a group of 4 resource elements; or of length 2 to a group of 2 resource elements.

Example 17: The method of Example 16, wherein one of:

a length-2 OCC is applied to one of a CDM group, wherein each CDM group corresponds to 2 unique antenna ports; and a length-4 OCC is applied to one of a CDM group, wherein each CDM group corresponds to 4 unique antenna ports.

Example 18: The method of any one of Examples 12 to 17, further comprising sending to the wireless device an antenna port indication.

Example 19: The method of Example 18, wherein the antenna port indication comprises indicating whether other ports within the same CDM group are scheduled and/or the number of CDM groups without physical downlink shared channel data scheduled.

Example 20: The method according to any one of Examples 12 to 19, wherein the CDM corresponds to length-4 OCC in dependence to subcarrier and/or physical resource block indices.

Example 21: The method according to any one of Examples 12 to 20, wherein the determined DMRS configuration is a first DMRS configuration, the method further comprising determining a second DMRS configuration, wherein the second DMRS is configured for resource elements unique from DMRS and cell-specific reference signals configured for any one of the other radio access technologies.

Example 22: The method according to Example 21, further comprising sending to a wireless device an indication to select between the first DMRS configuration and the second DMRS configuration.

Example 23: The method according to any one of Examples 12 to 22, wherein the DMRS configuration is for uplink multi-user, multiple input, multiple output, MU-MIMO.

Example 24: A wireless device/User Equipment comprising: processing circuitry, transceiver circuitry, memory and power supply circuitry configured to supply power to the wireless device, the processing circuitry configured to:
obtain a configuration for a demodulation reference signal, DMRS, wherein the DMRS comprises a pattern using common resource elements of at least two of the plurality of radio access technologies;
receive or transmit a data transmission based on the obtained demodulation reference signal.

Example 25: The wireless device of Example 24, wherein the processing circuitry is further configured to perform any of the steps of the Examples 1 to 11.

Example 26: A network node/base station comprising processing circuitry, transceiver circuitry and power supply circuitry configured to supply power to the network node, the processing circuitry configured to:
determine a configuration for a demodulation reference signal, DMRS, wherein the DMRS comprises a pattern using common resource elements of at least two of the plurality of radio access technologies;
receive or transmit a data transmission based on the determined demodulation reference signal.

Example 27: The network node of Example 26, wherein the processing circuitry is further configured to perform any of the steps of the Examples 12 to 23.

Example 28: A communication system including a host computer comprising:
processing circuitry configured to provide user data; and
a communication interface configured to forward the user data to a cellular network for transmission to a user equipment (wireless device),
wherein the cellular network supports a multi-user multiple input multiple output, MIMO, communications, wherein the communications system comprises radio spectrum shared by a plurality of radio access technologies.

Example 29: The communication system of Example 28 further including the network node.

Example 30: The communication system of Examples 28 or 29, further including the wireless device, wherein the wireless device is configured to communicate with the base station.

Example 31: The communication system of any one of Examples 28 to 30, wherein:
the processing circuitry of the host computer is configured to execute a host application, thereby providing the user data; and
the wireless device comprises processing circuitry configured to execute a client application associated with the host application.

Example 32: A method implemented in a communication system including a host computer, a non-terrestrial network comprising a communication satellite and a network node, wherein the network node is one of a terrestrial base station and a satellite base station or satellite gateway and a user equipment (wireless device), the method comprising:
at the host computer, providing user data; and
at the host computer, initiating a transmission carrying the user data to the wireless device via a cellular network comprising the network node, wherein the network node performs any of the steps of any of Examples 12 to 23.

Example 33: The method of Example 32, further comprising, at the base station, transmitting the user data.

Example 34: The method of Examples 32 or 33, wherein the user data is provided at the host computer by executing a host application, the method further comprising, at the wireless device, executing a client application associated with the host application.

Example 35: A user equipment (UE) configured to communicate with a base station, the UE comprising a radio interface and processing circuitry configured to performs any one of the Examples 1 to 11.

Example 36: A computer program comprising instructions which when executed on a computer or processing circuitry cause the computer or processing circuitry to perform any one of the methods of the Examples 1 to 1 for Examples 12 to 23.

Example 37: A computer program product, memory, or carrier comprising computer program instructions according to Example 36.

The invention claimed is:

1. A method performed by a wireless device operating in a communications system, wherein the communications system includes the use of radio spectrum shared by a plurality of radio access technologies, the method comprising:
obtaining a configuration for a demodulation reference signal, DMRS,
wherein the DMRS occupies resource elements identified by a pattern and uses a common resource element of at least two of the plurality of radio access technologies;
transmitting or receiving a data transmission based on the obtained demodulation reference signal, wherein the DMRS is configured for a first radio access technology and is orthogonal or pseudoorthogonal to a DMRS configured for a different one of the plurality of radio access technologies.

2. The method of claim 1, wherein the different one of the plurality of radio access technologies is configured with cell-specific reference signals, CRS.

3. The method of claim 1, wherein the DMRS comprises a sequence derived by code domain multiplexing, CDM, and using a same DMRS sequence as a DMRS for another user, with at least partially co-scheduled radio resource elements for another one of the plurality of radio access technologies.

4. The method of claim 3, wherein the DMRS comprises a time-domain orthogonal cover code, OCC, of length 4 to a group of 4 resource elements; or of length 2 to a group of 2 resource elements.

5. The method of claim 4, wherein one of:
a length-2 OCC is applied to one of a CDM group, wherein each CDM group corresponds to 2 unique antenna ports; and
a length-4 OCC is applied to one of a CDM group, wherein each CDM group corresponds to 4 unique antenna ports.

6. The method of claim 1, further comprising obtaining an antenna port indication.

7. The method of claim 6, wherein the antenna port indication comprises indicating whether other ports within the same CDM group are scheduled.

8. The method of claim 6, wherein the indication comprises the number of CDM groups without physical downlink shared channel data transmissions.

9. The method according to claim 1, wherein the CDM corresponds to length-4 OCC in dependence to subcarrier and/or physical resource block indices.

10. The method according to claim 1, wherein the obtained DMRS configuration is a first DMRS configuration, the method further comprising obtaining a second DMRS configuration, wherein the second DMRS is configured for resource elements unique from DMRS and cell-specific reference signals configured for any one of the other radio access technologies.

11. The method according to claim 10, further comprising
Receiving an indication to select between the first DMRS configuration and the second DMRS configuration.

12. The method according to claim 1, wherein the DMRS configuration is for uplink multi-user, multiple input, multiple output, MU-MIMO.

13. A method performed by a network node in a communications system, wherein the communications system includes the use of radio spectrum shared by a plurality of radio access technologies, the method comprising:
determining a configuration for a demodulation reference signal, DMRS, wherein the DMRS occupies resource elements identified by a pattern and uses a common resource element of at least two of the plurality of radio access technologies;
configuring a wireless device with a determined configuration for the DMRS;
receiving or transmitting a data transmission based on the determined configuration for the demodulation reference signal, wherein the DMRS is configured for a first radio access technology and is orthogonal or pseudo-orthogonal to a DMRS configured for a different one of the plurality of radio access technologies.

14. The method of claim 13, wherein the different one of the plurality of radio access technologies is configured with cell-specific reference signals, CRS.

15. The method of claim 13, wherein the DMRS comprises a sequence derived by code domain multiplexing, CDM, and using a same DMRS sequence as a DMRS for another user, with co-scheduled radio resource elements for another one of the plurality of radio access technologies, wherein the DMRS comprises a time domain orthogonal cover code, OCC, of length 4 to a group of 4 resource elements;
or of length 2 to a group of 2 resource elements, wherein one of: a length-2 OCC is applied to one of a CDM group, wherein each CDM group corresponds to 2 unique antenna ports; and
a length-4 OCC is applied to one of a CDM group, wherein each CDM group corresponds to 4 unique antenna ports.

16. The method of claim 13, further comprising
Sending to the wireless device an antenna port indication wherein the antenna port indication comprises one or more of:
indicating whether other ports within the same CDM group are scheduled; and
the number of CDM groups without physical downlink shared channel data transmissions.

17. The method according to claim 13, wherein the CDM corresponds to length-4 OCC in dependence to subcarrier and/or physical resource block indices.

18. The method according to claim 13, wherein the determined DMRS configuration is a first DMRS configuration, the method further comprising determining a second DMRS configuration, wherein the second DMRS is configured for resource elements unique from DMRS and cell-specific reference signals configured for any one of the other radio access technologies, sending to a wireless device an indication to select between the first DMRS configuration and the second DMRS configuration.

19. A wireless device comprising: processing circuitry, transceiver circuitry, memory and power supply circuitry configured to supply power to the wireless device, the processing circuitry configured to:
obtain a configuration for a demodulation reference signal, DMRS, wherein the DMRS comprises a pattern using common resource elements of at least two of the plurality of radio access technologies;
receive or transmit a data transmission based on the obtained demodulation reference signal, wherein the DMRS is configured for a first radio access technology and is orthogonal or pseudo-orthogonal to a DMRS configured for a different one of the plurality of radio access technologies.

20. A network node comprising processing circuitry, transceiver circuitry and power supply circuitry configured to supply power to the network node, the processing circuitry configured to:
determine a configuration for a demodulation reference signal, DMRS, wherein the DMRS comprises a pattern using common resource elements of at least two of the plurality of radio access technologies;
configure a wireless device with the determined configuration for the DMRS;
receive or transmit a data transmission based on the determined demodulation reference signal, wherein the DMRS is configured for a first radio access technology and is orthogonal or pseudo-orthogonal to a DMRS configured for a different one of the plurality of radio access technologies.

* * * * *

UNITED STATES PATENT AND TRADEMARK OFFICE
CERTIFICATE OF CORRECTION

PATENT NO. : 12,160,384 B2
APPLICATION NO. : 17/776705
DATED : December 3, 2024
INVENTOR(S) : Frenne et al.

Page 1 of 1

It is certified that error appears in the above-identified patent and that said Letters Patent is hereby corrected as shown below:

In the Specification

In Column 9, Line 25, delete "$\alpha_{k,l}^{(p)} = w_p(l') \cdot r(3 \cdot l' \cdot N_{RB}^{max,DL} + 3 \cdot n_{PRB} + k')$," and insert -- $a_{k,l}^{(p)} = w_p(l') \cdot r(3 \cdot l' \cdot N_{RB}^{max,DL} + 3 \cdot n_{PRB} + k')$ --, therefor.

In Column 12, Line 16, delete "$n_{DMRS}^{(1)} + n_{DMRS}^{(1)}$" and insert -- $n_{DMRS}^{(1)} + n_{DMRS}^{(2)}$ --, therefor.

In Column 34, Line 46, delete "1 for" and insert -- 11 or --, therefor.

In the Claims

In Column 34, Line 65, in Claim 1, delete "pseudoorthogonal" and insert -- pseudo-orthogonal --, therefor.

In Column 35, Line 39, in Claim 11, delete "Receiving" and insert -- receiving --, therefor.

In Column 36, Line 3, in Claim 15, delete "time domain" and insert -- time-domain --, therefor.

In Column 36, Line 15, in Claim 16, delete "Sending" and insert -- sending --, therefor.

Signed and Sealed this
Twenty-third Day of December, 2025

John A. Squires
*Director of the United States Patent and Trademark Office*